US012250081B2

United States Patent
Stare et al.

(10) Patent No.: US 12,250,081 B2
(45) Date of Patent: Mar. 11, 2025

(54) HYBRID AUTOMATIC REPEAT REQUEST (HARQ) MECHANISM FOR MULTICAST IN NR

(71) Applicant: Telefonaktiebolaget LM Ericsson (publ), Stockholm (SE)

(72) Inventors: Erik Stare, Sollentuna (SE); Jose Angel Leon Calvo, Aachen (DE); Jörg Huschke, Aachen (DE); Stefan Parkvall, Bromma (SE); Ratheesh Kumar Mungara, Sundbyberg (SE); Mats Folke, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 386 days.

(21) Appl. No.: 17/784,779

(22) PCT Filed: Dec. 18, 2020

(86) PCT No.: PCT/SE2020/051237
§ 371 (c)(1),
(2) Date: Jun. 13, 2022

(87) PCT Pub. No.: WO2021/133238
PCT Pub. Date: Jul. 1, 2021

(65) Prior Publication Data
US 2023/0019024 A1 Jan. 19, 2023

Related U.S. Application Data

(60) Provisional application No. 62/953,254, filed on Dec. 24, 2019.

(51) Int. Cl.
*H04L 1/1812* (2023.01)
*H04W 72/1273* (2023.01)
(Continued)

(52) U.S. Cl.
CPC ....... *H04L 1/1812* (2013.01); *H04W 72/1273* (2013.01); *H04W 72/23* (2023.01); *H04W 72/30* (2023.01)

(58) Field of Classification Search
None
See application file for complete search history.

(56) References Cited

U.S. PATENT DOCUMENTS

| 2008/0181163 A1 | 7/2008 | Ye et al. |
| 2017/0325277 A1 | 11/2017 | Fujishiro et al. |

(Continued)

FOREIGN PATENT DOCUMENTS

| JP | 2010516188 A | 5/2010 |
| WO | 2016121567 A1 | 8/2016 |

OTHER PUBLICATIONS

"Multiple HARQ procedures and intra-UE UCI prioritization", 3GPP TSG RAN WG1 Meeting #96bis, R1-1904504, Xi'an, China, Apr. 8-12, 2019, pp. 1-12.

(Continued)

*Primary Examiner* — Suhail Khan
(74) *Attorney, Agent, or Firm* — Murphy, Bilak & Homiller, PLLC

(57) ABSTRACT

Embodiments include methods, performed by a user equipment (UE), for hybrid ARQ (HARQ) feedback in relation to multicast transmissions from a network node in a radio access network (RAN). Such methods include receiving, from the network node, first downlink control information (DCI) scheduling a first multicast transmission associated with the UE and determining a HARQ feedback mode for the first multicast transmission. Such methods also include, based on the first DCI, attempting to decode the first multicast transmission; and selectively transmitting HARQ feedback related to the first multicast transmission to the network node based on the determined HARQ feedback (Continued)

mode and on whether the attempt to decode is successful or unsuccessful. Embodiments also include complementary methods for a network node, as well as UEs and network nodes configured to perform such methods.

22 Claims, 6 Drawing Sheets

(51) Int. Cl.
*H04W 72/23* (2023.01)
*H04W 72/30* (2023.01)

(56) References Cited

U.S. PATENT DOCUMENTS

2020/0067652 A1* 2/2020 Liu .......................... H04L 5/00
2022/0086806 A1* 3/2022 Lu ......................... H04W 72/02

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.

"Feature lead summary#2 on Resource allocation for NR sidelink Mode 1", 3GPP TSG-RAN WG1 Meeting #99, R1-1913547, Chongqing, China, Nov. 18-22, 2019, pp. 1-32.

"Summary#2 on NR Multicast and Broadcast Services", 3GPP TSG RAN WG1 #102-e, R1-2007235, e-Meeting, Aug. 17-28, 2020, pp. 1-57.

3GPP , "3rd Generation Partnership Project; Technical Specification Group Radio Access Network; Evolved Universal Terrestrial Radio Access (E-UTRA); Physical layer procedures (Release 15)", 3GPP TS 36.213 V15.7.0, Sep. 2019, pp. 1-551.

"3GPP TS 38.401 V15.6.0", 3rd Generation Partnership Project; Technical Specification Group Radio Access Network; NG-RAN; Architecture description (Release 15), Jul. 2019, pp. 1-46.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TS 23.501 V16.6.0", 3rd Generation Partnership Project; Technical Specification Group Services and System Aspects; System architecture for the 5G System (5GS); Stage 2 (Release 16), Sep. 2020, pp. 1-447.

"3GPP TS 38.211 V15.7.0", 3rd Generation Partnership Project; Technical Specification Group Radio Access Network; NR; Physical channels and modulation (Release 15), Sep. 2019, pp. 1-97.

* cited by examiner

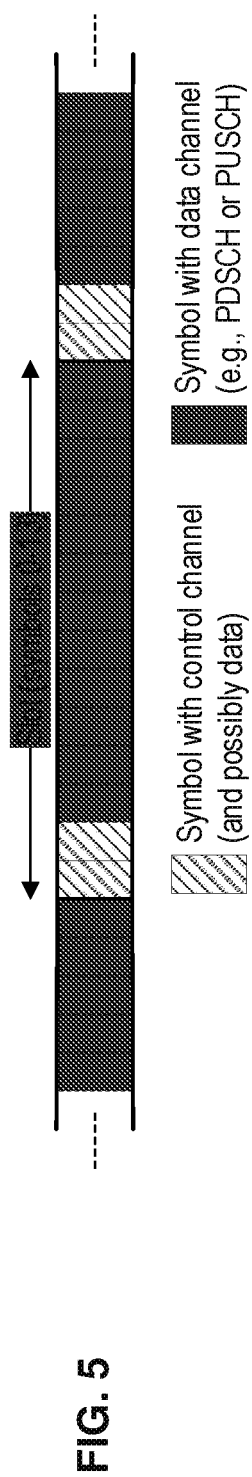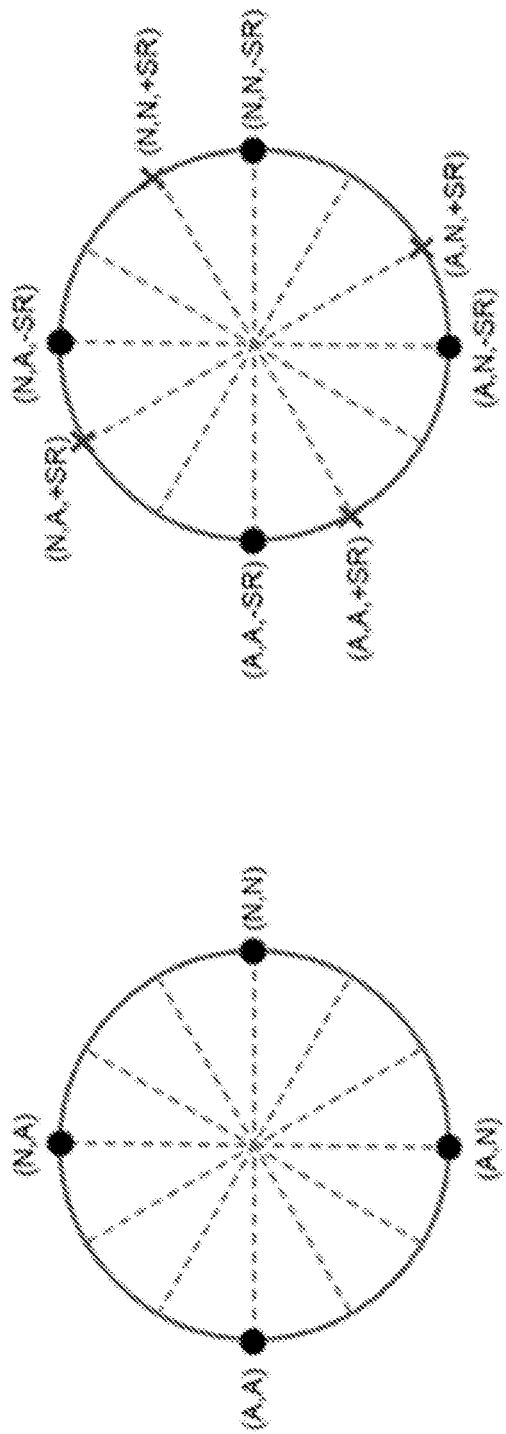
FIG. 5
FIG. 6A
FIG. 6B

HYBRID AUTOMATIC REPEAT REQUEST (HARQ) MECHANISM FOR MULTICAST IN NR

TECHNICAL FIELD

The present invention generally relates to wireless communication networks, and particularly relates to improvements to reliability of multicast transmissions to wireless devices (also referred to as user equipment, or UEs) operating in wireless communication networks.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

FIG. 2 illustrates a block diagram of an exemplary control plane (CP) protocol stack between a UE, an eNB, and an MIME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer provides resources for transferring data over transport channels via the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a LIE is powered ON it will be in the RRC_IDLE state until an RRC connection is established with the network, at which time the UE will transition to RRC_CONNECTED state (e.g., where data transfer can occur). The UE returns to RRC_IDLE. after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the DL, and on Single-Carrier Frequency Division Multiple Access (SC-FDMA) with a cyclic prefix in the UL. To support transmission in paired and unpaired spectrum, the LTE PHY supports both Frequency Division Duplexing (FDD) (including both full- and half-duplex operation) and Time Division Duplexing (TDD). The FDD DL radio frame has a fixed duration of 10 ms and consists of 20 slots, labeled 0 through 19, each with a fixed duration of 0.5 ms. A 1-ms subframe includes two consecutive slots, each of which includes $N^{DL}_{symb}$ OFDM symbols comprised of $N_{sc}$ OFDM subcarriers. Exemplary values of $N^{DL}_{symb}$ can be 7 (with normal CP) or 6 (with extended-length CP) for subcarrier spacing (SCS) of 15 kHz. $N_{sc}$ is configurable based upon available channel bandwidth.

A particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot, where $N^{RB}_{sc}$ is 12 for 15-kHz SCS.

An exemplary LTE FDD uplink (UL) radio frame can be arranged in a manner similar to the exemplary FDD DL radio frame described above. For example, each UL slot includes $N^{UL}_{symb}$ OFDM symbols, each of which includes $N_{sc}$ OFDM subcarriers.

In general, a physical channel corresponds a set of resource elements carrying information that originates from higher layers. Downlink (DL, i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

PDSCH is the main physical channel used for unicast downlink data transmission, but also for transmission of RAR (random access response), certain system information blocks, and paging information. PBCH carries the basic system information (SI) required by the UE to access the network. PDCCH is used for transmitting downlink control information (DCI) that carries scheduling information for DL messages on PDSCH and grants for UL transmission on PUSCH, among other information.

Uplink (UL, i.e., UE to eNB) physical channels provided by the LTE PHY include Physical Uplink Shared Channel (PUSCH), Physical Uplink Control Channel (PUCCH), and Physical Random Access Channel (PRACH). PUSCH is the uplink counterpart to the PDSCH. PUCCH is used by UEs to transmit uplink control information, including HARQ acknowledgements, channel state information reports, etc. PRACH is used for random access preamble transmission.

NR shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some similar properties as the suspended condition for LTE.

As another example, HARQ is used in both LTE and NR. In this arrangement, a receiver of a first data packet replies to the sender with a positive (ACK) or a negative (NACK) acknowledgement (also referred to as feedback), depending on whether the receiver correctly decoded the first packet. Based on receiving an ACK, the sender will transmit a second packet (if available). Based on receiving a NACK, the sender will retransmit either the same version or a different version of the first data packet. If needed, a single data packet can be retransmitted multiple times. In this manner, HARQ can improve the reliability of transmissions from the sender to the receiver, albeit with increased complexity and/or latency for a correctly-decoded packet.

Typically, HARQ is most suitable for unicast and group-cast (also referred to as multicast) transmissions because these transmission modes often have some way of identifying the source and the destination of a packet (e.g., source and destination IDs), which facilitates feedback and data retransmission. HARQ is often not used in broadcast transmission because feedback and/or retransmission are not of interest, or their benefits do not outweigh the associated complexity added by many recipients of a broadcast transmission.

Even so, both LTE and NR lack a mechanism to increase the reliability of communications in multicast scenarios based on UL transmissions. These scenarios include transmissions with HARQ enabled that are intended for a (pre-)defined group of users, as well as various UL feedback from the receiver to the transmitter. Accordingly, the reliability of such transmissions can be inadequate for various use cases and/or applications.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some embodiments of the present disclosure include methods (e.g., procedures) for HARQ feedback in relation to multicast transmissions from a network node in a radio access network (RAN). These exemplary methods can be performed by a user equipment (UE, e.g., wireless device, IoT device, modem, etc. or component thereof) in communication with a network node (e.g., base station, eNB, gNB, etc., or components thereof) in the RAN (e.g., E-UTRAN, NG-RAN These exemplary methods can include receiving, from the network node, first downlink control information (DCI) scheduling a first multicast transmission associated with the UE. These exemplary methods can also include determining a HARQ feedback mode for the first multicast transmission. These exemplary methods can also include, based on the first DCI, attempting to decode the first multicast transmission. These exemplary methods can also include selectively transmitting HARQ feedback, related to the first multicast transmission, to the network node based on the determined HARQ feedback mode and on whether the attempt to decode is successful or unsuccessful.

In some embodiments, determining the HARQ feedback mode can be based on one or more of the following: the first DCI and a radio resource control (RRC) message received from the network node before the first DCI.

In some of these embodiments, the first DCI or the RRC message can include a field with the following values: a first value indicating that HARQ feedback should not be transmitted; and a second value indicating that HARQ feedback should be transmitted. In some embodiments, the second value can indicate that both positive acknowledgements (ACK) and negative acknowledgements (NACK) should be transmitted, and the field can include a third value indicating that only NACK should be transmitted.

In other of these embodiments, the first DCI includes a cyclic redundancy check (CRC) of the first DCI payload, with the CRC being scrambled by an identifier associated with the UE. In such embodiments, the identifier indicates the HARQ feedback mode. In such embodiments, the RRC message can include configuration information comprising one or more group-specific identifiers (e.g., MC-RNTI), each associated with at least one of the following: a group of one or more UEs, including the UE; and a HARQ feedback mode for multicast transmissions from the network node.

In some of these embodiments, the determining operations can include: based on the identifier being a UE-specific identifier (e.g., C-RNTI), determining that HARQ feedback should be transmitted; and based on the identifier being one of the group-specific identifiers (e.g., MC-RNTI), determining that HARQ feedback should not be transmitted.

In other of these embodiments, the determining operations can include: based on the identifier being a first one of the group-specific identifiers (e.g., MC-RNTI-1), determining that HARQ feedback should be transmitted according to a first mode; and based on the identifier being a second one of the group-specific identifiers (e.g., MC-RNTI-2), determining that HARQ feedback should be transmitted according to a second mode different than the first mode.

In some embodiments, the selectively transmitting operations can include refraining from transmitting HARQ feedback in response to each of the following:
 the determined HARQ feedback mode is HARQ feedback should not be transmitted;
 the attempt to decode is successful and the determined HARQ feedback mode is only NACK should be transmitted; and
 the attempt to decode is unsuccessful and the determined HARQ feedback mode is only ACK should be transmitted.

In some embodiments, the selectively transmitting operations can include transmitting a NACK based on the attempt to decode is unsuccessful and the determined HARQ feedback mode is only NACK should be transmitted. In such embodiments, the NACK can be transmitted using an indicator and an uplink resource that are common to a multicast group that includes the UE.

In some embodiments, these exemplary methods can also include subsequently receiving second DCI scheduling a retransmission of the first multicast transmission. In some of these embodiments, the second DCI can indicate that the retransmission is a unicast transmission to the UE. In such embodiments, attempting to decode the first multicast transmission can include storing first soft information associated with the first multicast transmission. In such embodiments, these exemplary methods can also include determining second soft information based on receiving the retransmission and decoding a data message based on a combination of the first soft information and the second soft information.

In other of these embodiments, the second DCI can indicate that the retransmission is a second multicast transmission. In such embodiments, the first DCI can include a CRC, of the first DCI payload, that is scrambled by a first group-specific identifier (e.g., MC-RNTI-1) associated with the UE, and the second DCI can include a CRC, of the second DCI payload, that is scrambled by a second group-specific identifier (e.g., MC-RNTI-2) associated with the UE. For example, the first and second group-specific identifiers can be previously received in an RRC configuration message.

Other embodiments of the present disclosure include methods (e.g., procedures) for managing hybrid ARQ (HARQ) feedback in relation to multicast transmissions to a group of user equipment (UEs). These exemplary methods can be performed by a network node (e.g., base station, eNB, gNB, etc., or component thereof) of a radio access network (RAN, e.g., E-UTRAN, NG-RAN), in communication with the user equipment (UEs, e.g., wireless devices, IoT devices, modems, etc. or components thereof).

These exemplary methods can include transmitting first downlink control information (DCI) scheduling a first multicast transmission associated with the group of UEs. These exemplary methods can also include indicating a HARQ feedback mode for at least the first multicast transmission. These exemplary methods can also include transmitting the first multicast transmission according to the first DCI. These exemplary methods can also include, based on the indicated HARQ feedback mode, selectively monitoring for HARQ feedback related to the first multicast transmission from one or more UEs of the group.

In some embodiments, the HARQ feedback mode can be indicated by one or more of the following: the first DCI and respective radio resource control (RRC) messages transmitted to UEs of the group before the first DCI.

In some of these embodiments, the first DCI or the RRC message can include a field with the following values: a first value indicating that HARQ feedback should not be transmitted; and a second value indicating that HARQ feedback should be transmitted. In some embodiments, the second value can indicate that both positive acknowledgements (ACK) and negative acknowledgements (NACK) should be transmitted, and the field can include a third value indicating that only NACK should be transmitted.

In other of these embodiments, the first DCI includes a cyclic redundancy check (CRC) of the first DCI payload, with the CRC being scrambled by an identifier associated with the UE. In such embodiments, the identifier indicates the HARQ feedback mode for the first multicast transmission. In such embodiments, the RRC message can include configuration information comprising one or more group-specific identifiers (e.g., MC-RNTI), each associated with at least one of the following: a group of one or more UEs, including the UE; and a HARQ feedback mode for multicast transmissions from the network node.

In some of these embodiments, the identifier being a UE-specific identifier (e.g., C-RNTI) indicates that HARQ feedback should be transmitted, while the identifier being one of the group-specific identifiers (e.g., MC-RNTI) indicates that HARQ feedback should not be transmitted.

In other of these embodiments, the identifier being a first one of the group-specific identifiers (e.g., MC-RNTI-1) indicates that HARQ feedback should be transmitted according to a first mode, while the identifier being a second one of the group-specific identifiers (e.g., MC-RNTI-2) indicates that HARQ feedback should be transmitted according to a second mode different than the first mode.

In some embodiments, the selectively monitoring operations can include refraining from monitoring for HARQ feedback, to the first multicast transmission, based on indicating that HARQ feedback should not be transmitted. In some embodiments, the selectively monitoring operations can include, based on indicating that only NACK should be transmitted, monitoring an uplink resource that is common to a multicast group for an indicator that one or more UEs of the group has transmitted a NACK.

In some embodiments, these exemplary methods can also include subsequently transmitting one or more second DCI scheduling a retransmission of the first multicast transmission and then transmit the retransmission according to the one or more second DCI. In some embodiments, the second DCIs can be transmitted via respective UE-specific beams.

In some embodiments, the retransmission can be transmitted according to one of the following retransmission modes:
- a second multicast transmission to the group of UEs;
- respective unicast transmissions to the respective of UEs of the group; or
- a second multicast transmission to a first subset of the group of UEs, and one or more unicast transmissions to respective UEs of the group that are not included in the first subset.

In some of these embodiments, these exemplary methods can also include selecting one of these retransmission modes based on one or more of the following:
- for each particular UE, a quantity of NACKs received from the particular UE in relation to a first threshold; and
- a quantity of NACKs received from the plurality of UEs during a time window in relation to a second threshold.

In some embodiments, at least one of the first threshold and the second threshold can be based on congestion conditions associated with the UEs and the network node.

In some embodiments, the one or more second DCI indicates that the retransmission comprises respective unicast transmissions to respective UEs of the group. For example, the one or more second DCI include respective cyclic redundancy check (CRCs), of the respective second DCI payloads, that are scrambled by respective UE-specific identifiers (e.g., C-RNTIs).

In other embodiments, the second DCI indicates that the retransmission is a second multicast transmission to the group of UEs. In such embodiments, the first DCI can include a CRC, of the first DCI payload, that is scrambled by a first group-specific identifier associated with the group of UEs (e.g., MC-RNTI-1), while the second DCI can include a CRC, of the second DCI payload, that is scrambled by a second group-specific identifier associated with the group of UEs (e.g., MC-RNTI-2). For example, the first and second group-specific identifiers can be previously provided to the group of UEs in an RRC configuration message.

Other embodiments include user equipment (UEs, e.g., wireless devices, IoT devices, or components thereof, such as a modem) and network nodes (e.g., base stations, eNBs, gNBs, CU/DUs, controllers, etc.) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other aspects, features, benefits, and/or advantages of embodiments of the present disclosure will become apparent upon reading the following Detailed Description in view of the Drawings briefly described below.

BRIEF DESCRIPTION OF THE DRAWINGS

FIG. 5 shows an exemplary NR slot configuration.

FIGS. 6A-6B show exemplary phase rotations used to convey HARQ ACK/NACK and, optionally, scheduling request (SR) information on an NR physical uplink control channel (PUCCH).

DETAILED DESCRIPTION

Figure 1:
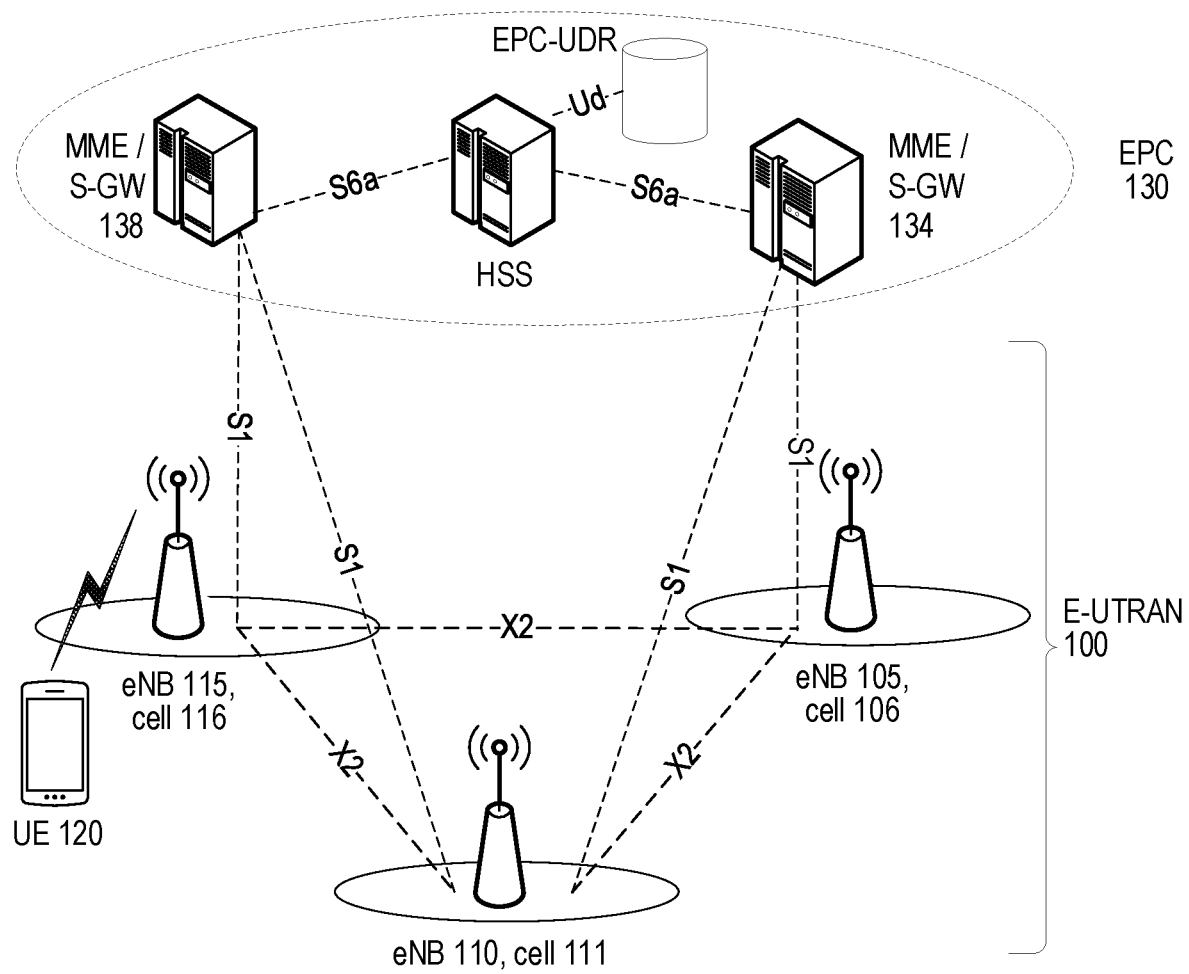
FIG. 1 is a high-level illustration of an exemplary architecture of the Long-Term Evolution (LTE) Evolved UTRAN (E-UTRAN) and Evolved Packet Core (EPC) network.
Figure 2:
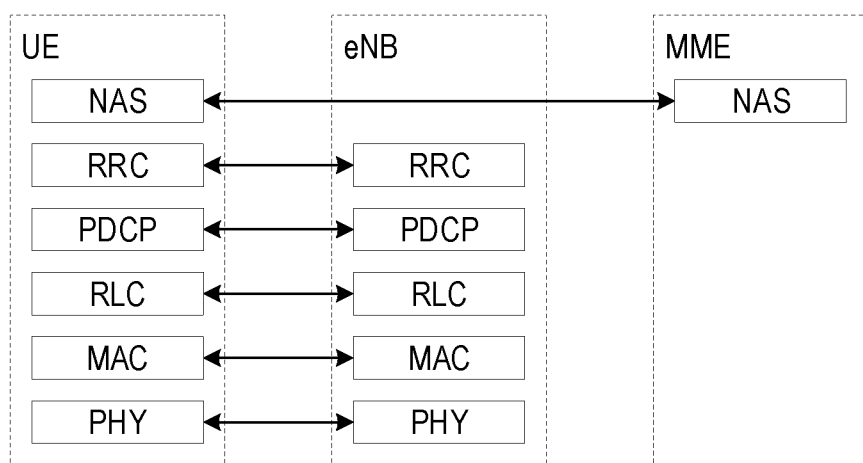
FIG. 2 is a high-level illustration of exemplary protocol layers of the control-plane portion of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of to device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, both LTE and NR lack a mechanism to increase the reliability of communications in multicast scenarios based on UL transmissions. These scenarios include transmissions with HARQ mechanism enabled that are intended for a (pre-)defined group of users, as well as various UL feedback from the receiver to the transmitter. As such, the reliability of such transmissions can be inadequate for various use cases and/or applications. This is discussed in more detail below after the following introduction to 5G/NR network architecture and radio interface.

Figure 3:
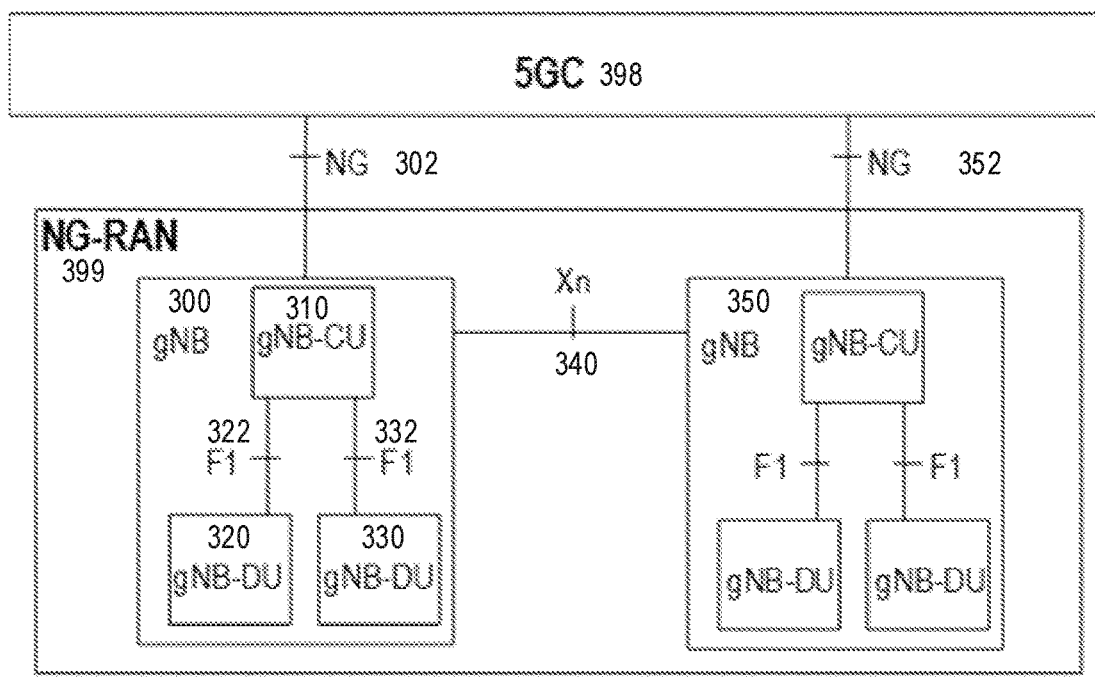
FIG. 3 illustrates a high-level view of an exemplary 5G network architecture.

FIG. 3 shows a high-level view of an exemplary 5G network architecture, including a Next Generation RAN (NG-RAN) 399 and a 5G Core (5GC) 398. NG-RAN 399 can include one or more gNodeB's (gNBs) connected to the 5GC via one or more NG interfaces, such as gNBs 300, 350 connected via interfaces 302, 352, respectively. More specifically, gNBs 300, 350 can be connected to one or more Access and Mobility Management Functions (AMF) in the 5GC 398 via respective NG-C interfaces. Similarly, gNBs 300, 350 can be connected to one or more User Plane Functions (UPFs) in 5GC 398 via respective NG-U interfaces.

Although not shown, in some deployments 5GC 398 can be replaced by an Evolved Packet Core (EPC), which conventionally has been used together with LTE E-UTRAN. In such deployments, gNBs 300, 350 can connect to one or more Mobility Management Entities (MMEs) in an EPC via respective S1-C interfaces. Similarly, gNBs 300, 350 can connect to one or more Serving Gateways (SGWs) in EPC via respective NG-U interfaces.

In addition, the gNBs can be connected to each other via one or more Xn interfaces, such as Xn interface 340 between gNBs 300 and 350. The radio technology for the NG-RAN is often referred to as "New Radio" (NR). With respect to the NR interface to UEs (also referred to as the "Uu interface"), each of the gNBs can support frequency division duplexing (FDD), time division duplexing (TDD), or a combination thereof. The radio-related protocols between UEs and the NG-RAN over the Uu interface are generally referred to as the access stratum (AS), while the protocols between UEs and the core network (e.g., 5GC or EPC) are generally referred to as the non-access stratum (NAS).

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (e.g., NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP shall be applied.

The NG RAN logical nodes shown in FIG. 3 include a Central Unit (CU or gNB-CU) and one or more Distributed Units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. A DU (e.g., gNB-DUs 320, 330) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 322 and 332 shown in FIG. 3. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

In Rel-15, an NR UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);
PRB-index-UL-common for UL in a PCell;
PRB-index-DL-Dedicated for DL in a secondary cell (SCell);
PRB-index-UL-Dedicated for UL in an SCell; and
PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from 0 to $N_{BWP,i}^{size}-1$, where i is the index of the particular BWP for the carrier.

Similar to LTE, each NR resource element (RE) corresponds to one OFDM subcarrier during one OFDM symbol interval. NR supports various SCS values $\Delta f=(15\times 2^{\mu})$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz. Table 1 below summarizes the supported NR numerologies and associated parameters. Different DL and UL numerologies can be configured by the network.

transmission) with on-time (symbol 0) or late (symbol>0) starts, "DL-heavy" slots (e.g., one UL symbol), and "UL-heavy" slot with a single DL symbol carrying DL control information. Various guard periods before initial DL symbols ($T_{UL-DL}$) and before initial UL symbols ($T_{DL-UL}$) can also be used.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

FIG. 5 shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 5, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in an LTE subframe. In NR, however, each REG consists of all 12 REs of one OFDM symbol in an RB, whereas an LTE REG includes only four REs. Like in LTE, the CORESET time domain size can be indicated by PCFICH. In LTE, the frequency bandwidth of the control region is fixed (i.e., to the total system bandwidth), whereas the frequency bandwidth of the NR CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission.

TABLE 1

| $\mu$ | $\Delta f = 2^{\mu} \cdot$ 15 (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 4:
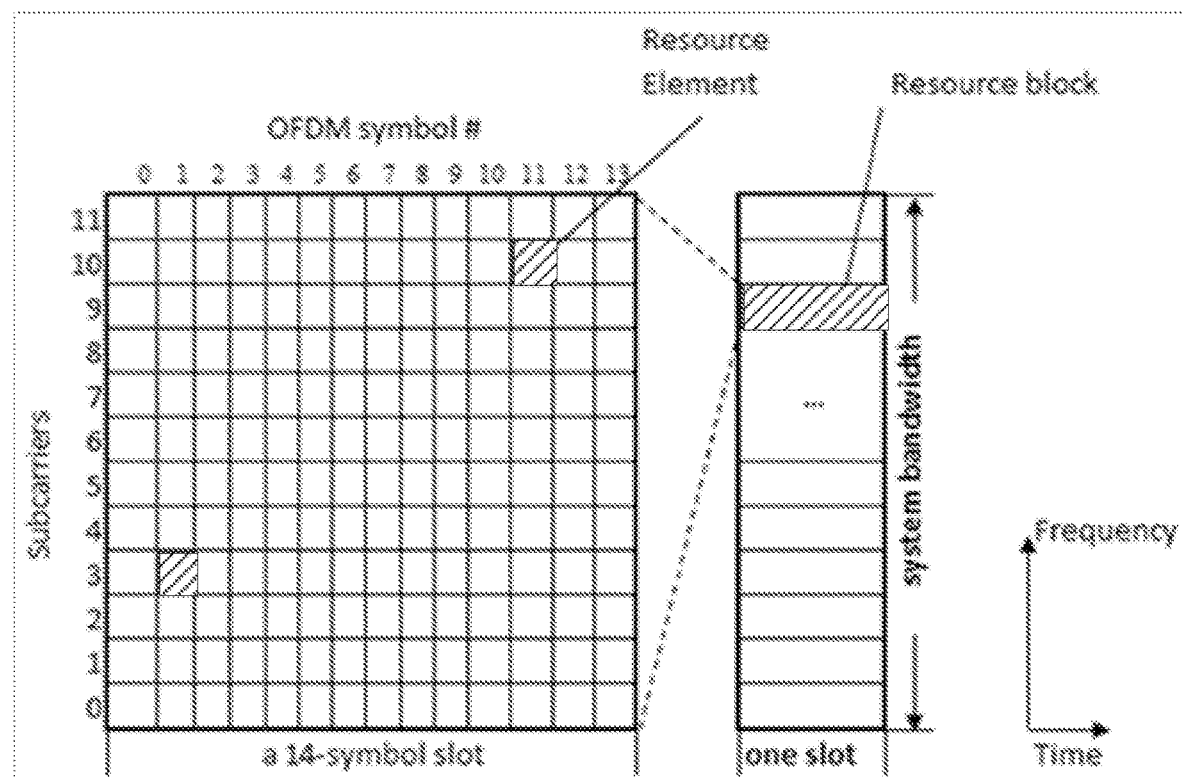
FIG. 4 shows an exemplary time-frequency resource grid for a New Radio (NR) slot.

FIG. 4 shows an exemplary time-frequency resource grid for an NR slot. As illustrated in FIG. 4, a resource block (RB) consists of a group of 12 contiguous OFDM subcarriers for a duration of a slot, i.e., 14 OFDM symbols for normal CP and 12 symbols for extended CP. An NR slot can also be arranged with various combinations of UL and DL symbols. Options can include DL-only slots (i.e., no UL It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (v) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2. Similar techniques can be used by the UE for PUSCH transmission scheduled by DCI (e.g., formats 0_0 or 0_1).

DCI can also include information about various timing offsets (e.g., in slots or subframes) between PDCCH and PDSCH, PUSCH, HARQ, and/or channel state information reference signals (CSI-RS). For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and a responsive UE HARQ ACK/NACK transmission on PUSCH. In addition, offset K3 represents the number of slots between this responsive ACK/NACK and a corresponding retransmission of data on PDSCH. In addition, offset K2 represents the number of slots between the UE's reception of a UL grant DCI (e.g., formats 0_0 or 0_1) on PDCCH and the subsequent PUSCH transmission. Each of these offsets can take on values of zero and positive integers.

In both LTE and NR, UEs can transmit UCI (Uplink Control Information) on PUCCH. For example, UCI can include HARQ feedback, CSI feedback, and scheduling requests (SR). Currently there are five different PUCCH formats (0-4) defined for carrying different types of UCI, where the sizes of the various formats range from one to 14 OFDM symbols. The various PUCCH formats for NR are further defined in 3GPP TS 38.211. Even so, the following discussion will focus on PUCCH format 0, the most relevant to embodiments of the present disclosure. PUCCH format 0 is typically transmitted at the end of a slot and spans 1-2 OFDM symbols. However, it is possible to transmit PUCCH format 0 also in other positions within a slot.

PUCCH format 0 is one of the short PUCCH formats in NR and can carry up to two bits. It is used for sending HARQ feedback and a SR. In this format, the information bits select a sequence to be transmitted, which is generated by different phase rotations of the same underlying length-12 base sequence. In other words, the phase rotations carry the information.

FIGS. 6A and 6B show exemplary PUCCH format 0 phase rotations as a function of HARQ ACK/NACK (A/N, respectively) and SR. Twelve different phase rotations are defined for the same base sequence, providing up to 12 different orthogonal sequences from each base sequence. A linear phase rotation in the frequency domain is equivalent to applying a cyclic shift in the time domain, hence, the term "cyclic shift" is sometimes used with an implicit reference to the time domain. FIG. 6A shows mappings of two ACK/NACK information bits to four of the 12 phase rotations, while FIG. 6B shows mappings of two ACK/NACK information bits plus an SR bit to eight of the 12 phase rotations.

Certain UEs can also communicate with each other directly via sidelink (SL) as well as indirectly via UL and DL with the 3GPP RAN. The first 3GPP standardization of SL communications was in LTE Rel-12, targeting public safety use cases. Since then, a number of enhancements have been introduced to broaden the use cases that could benefit from device-to-device (D2D) technology.

In Rel-14 and Rel-15, LTE was extended to include support D2D SL features targeting vehicular communications, which are collectively referred to as vehicle-to-everything (or V2X). V2X use cases for NR also include applications not exclusively safety-related, such as sensor/data sharing between vehicles to enhance knowledge of the surrounding vehicular environment. As such, NR SL is envisioned to support applications such as vehicles platooning, cooperative maneuver between vehicles, remote/autonomous driving, etc.

SL allows D2D UEs to establish a communication when in 3GPP network coverage (InC), out of coverage (OOC), and in partial coverage situations (i.e., when one D2D UE is InC but the other is OOC). Much like DCI via PDCCH, discussed above, UEs can exchange SL control information (SCI) via a physical SL control channel (PSCCH).

When operated InC or in partial coverage, the network may exercise various degrees of control over behavior of the UEs communicating via SL. Broadcast, groupcast/multicast, and unicast transmissions for V2X SL operation are supported for the InC, OOC, and partial-coverage scenarios. For unicast and groupcast/multicast SL transmissions, HARQ (i.e., ACK/NAK) feedback and HARQ combining are supported in the UE physical layer (PHY). For example, HARQ feedback is sent via the physical SL feedback channel (PSFCH).

However, use of HARQ retransmissions in groupcast/multicast communication is more challenging than in unicast communication. Due to the lack of a central controller in SL, it is not straightforward to specify UE behavior when multiple HARQ feedbacks are received. In general, enabling HARQ for groupcast/multicast should be configurable. For example, HARQ for a groupcast/multicast session should not be enabled when the number of the members in the session is large, in order to avoid heavy signaling overhead. In addition, certain rules to control when the transmitter UE can retransmit a packet may be necessary, in order to avoid unnecessary retransmissions.

In general, HARQ feedback is transmitted based on a deterministic time and frequency relationship with the associated data transmission. For example, the HARQ feedback can be transmitted in a (pre-)configured PSFCH resource. The advantage is that there would be a 1:1 mapping between the HARQ process and its related HARQ feedback, thereby limiting the overhead of the HARQ process identification in the control signaling.

Furthermore, transmissions having HARQ feedback (e.g., unicast/multicast) must be able to coexist with transmissions without HARQ feedback (e.g., broadcast). One straightforward approach for coexistence is to (pre-)configure PSFCH resources from the system perspective. For example, if PSFCH is present in a slot then all the UEs will assume the last few symbols of the slots as reserved for PSFCH transmissions. On the other hand, this leads to waste of scarce resources when no HARQ feedback is sent.

A more flexible-but-complex approach is to indicate presence of a HARQ feedback in a slot using SCI via PSCCH. However, this approach can lead to receiver automatic gain control (AGC) imbalance due to power change within a slot, which can cause failed PSSCH decoding and decreased transmission reliability. Thus, the two approaches present a trade-off between resource efficiency and PSSCH reliability. Due to critical nature of V2X applications, however, NR supports the former approach, i.e., (pre-)configuring PSFCH resources from system perspective.

Even so, for both unicast and groupcast/multicast sessions, it may not always be necessary and/or beneficial to support HARQ feedback. As an example, HARQ retransmissions may lead to unacceptable latency for certain latency-critical use cases. Accordingly, it can be beneficial to enable or disable HARQ feedbacks/transmissions based one use cases and/or scenarios. For example, NR supports distance-based enablement of HARQ feedback in groupcast/multicast communication. In other words, if a data-receiving UE is far away from the data-transmitting UE, the data-receiving UE does not transmit HARQ feedback for a data packet. This arrangement reduces the number of HARQ retransmissions and allows connection-less groupcast/multicast, in which no higher layer groupcast/multicast session establishment is performed and HARQ is enabled for a particular service based on its communication range requirement.

Furthermore, NR supports two types of HARQ mechanisms in groupcast/multicast scenarios. One option involves transmitting ACK if PSSCH is successfully decoded or NACK in case of failed PSSCH decoding. The other option involves only transmitting NACK in case of failed PSSCH decoding; ACKs are not transmitting. The latter option provides no way for a transmitter UE to distinguish between failed PSCCH and successful data transmission. In general, however, the transmitter UE assumes that the PSSCH has been successfully decoded if no NACK is received. The latter option is particularly useful to limit unnecessary transmissions and reduce congestion in the network. The selection between these two options is configurable based on the scenario and/or use case.

A conventional approach for increasing reliability in groupcast/multicast scenarios involves repetitions of the transmitted data using a single, common modulation and coding scheme (MCS) without combining these retransmissions. Drawbacks of this approach include increased congestion in the network (due to repetitions) and inadequate transmission quality/reliability for certain group members due to variation in channel conditions among group members.

Exemplary embodiments of the present disclosure address these and other problems, issues, and/or drawbacks by providing flexible HARQ mechanisms for multicast transmission to a (pre-)defined group of users. In such embodiments, users can employ their UL connection with the network (e.g., serving gNB) to indicate successful or unsuccessful reception of a DL transmission, enabling the network to act and/or respond accordingly. For example, the gNB's retransmission scheme can be based on the UE conditions.

In general, a gNB and served UEs can be configured with different HARQ configurations depending on different settings such as network conditions, number of users within a group, required quality of service, etc. These configurations define the usage of HARQ feedback, as well as the usage and/or type of retransmissions (e.g., original transmission in multicast and re-transmission in unicast). In general, retransmissions can be configured as any of the following:
- as one multicast transmission to the full group;
- as several multicast transmissions, each addressing a subgroup of the full group;
- as one or more unicast transmissions to address individual UEs; or
- multicast combined with unicast, as above.

In some embodiments, retransmissions can also be used without UE feedback, so that the overall transmission can be (pre-)configured for a determined number of re-transmissions. In this case the solution provides additional time diversity and can be used for an unlimited number of UEs, in RRC_CONNECTED, RRC_INACTIVE, or RRC_IDLE state.

These flexibly configured HARQ mechanisms can provide various advantages and/or benefits. For example, a group of UEs can be efficiently addressed using a new group identifier defined for multicast transmissions, e.g., using a multicast RNTI (MC-RNTI) that is a function of or based on a group_ID associated with the multicast group. As another example, the HARQ configurations can be included in the existing control framework for the Uu interface (e.g., PDCCH and DCI fields) without significant increases in complexity and/or capacity requirements. In addition, such mechanisms can facilitate bit-level soft-combining of several retransmissions based on incremental redundancy, which can be transmitted using different casting modes (e.g., soft-combine multicast transmissions with unicast retransmissions, and/or vice versa). Furthermore, such mechanisms can facilitate network retransmission of data packets or messages using unicast or multicast mode taking into consideration particular conditions of a UE, group of UEs, or subset of a group of UEs.

As mentioned above, at a high level, embodiments provide a mechanism to enable and/or facilitate HARQ in multicast scenarios. In such embodiments, a HARQ configuration can be indicated implicitly by a RNTI (e.g., used to scramble CRC), or can signaled explicitly using a new DCI field within the PDCCH. Different HARQ configurations can be created and adaptively used depending on network conditions and/or UE requirements or service constraints (e.g., required QoS for a transmission associated with a specific service). Moreover, depending on the HARQ configuration, retransmissions can be addressed and/or provided to a group of UEs in flexible manner by the network (e.g., serving gNB) without extra reconfiguration or signaling, such as unicast only for intended UEs or multicast to the full group. Furthermore, such configurations facilitate soft-combining of retransmissions based on different casting modes, e.g., unicast and multicast retransmission of the same data packet.

In some embodiments, an active UL connection is required between UE and serving gNB, such that only UEs in RRC_CONNECTED state may have HARQ feedback enabled and/or disabled by the serving gNB both in unicast and/or multicast. In such embodiments, the enabling and/or disabling can be performed in various ways, discussed below.

In some embodiments, it is possible to define different HARQ configurations without including any additional information in DCI. In this case, the MC_RNTI can implicitly signal the HARQ configuration, for example, of HARQ feedback for a DL transmission (e.g., PDSCH) that is scheduled by the DCI scrambled by the MC-RNTI. As an example, if the UE is scheduled by a DCI scrambled by MC-RNTI, then the UE should not transmit HARQ feedback for the scheduled PDSCH transmission. On the other hand, if the UE is scheduled by a DCI scrambled by the UE's C-RNTI (or other unicast-related RNTIs), then the UE generates HARQ feedback for the scheduled PDSCH transmission.

In some embodiments, the response to receiving a DCI scrambled with MC-RNTI can also be based on a previous configuration (e.g., via RRC from the network) enabling or disabling the UE's HARQ transmission responsive to MC-RNTI. For example, this configuration information can be part of an assignment of an MC-RNTI to the UE, or part of a resource configuration for PUCCH. In some embodiments, an MC_RNTI including an implicit HARQ configuration (e.g., MC_RNTI_HARQ) can be defined as a function of the group ID of the group or based on the specific HARQ configuration for the group.

In other embodiments, a DCI for scheduling a multicast or unicast transmission can include a new field, e.g., HARQ_config, to indicate an HARQ configuration (e.g., whether HARQ feedback is required and type, if required) for the related PDSCH transmission. For an exemplary two-bit DCI field, the following four HARQ configurations can be associated with the respective four DCI values:

0. No ACK/NACK→HARQ_config=00 in DCI;
1. Only ACK→HARQ_config=01 in DCI;
2. Only NACK→HARQ_config=10 in DCI;
3. Both ACK and NACK→HARQ_config=11 in DCI.

In some embodiments, option 2 (only NACK) can be further divided into two sub-options for NACK with and without UE_ID. The sub-option of without UE_ID can facilitate simulcast-NACK where all UEs in a group transmit identical signals in the same radio resources (e.g., time-frequency aligned). Such an arrangement can reduce usage of radio resources, albeit with the drawback that a the receiving gNB cannot distinguish which, or how many, UEs have transmitted a NACK. Alternately, NACK with UE_ID can facilitate such identification and, consequently, unicast retransmissions.

An advantage of using a DCI field in this manner is that the gNB can change the required HARQ configuration for UEs quickly and efficiently, simply by modifying a field DCI without the need for sharing a new RNTI or other extra signaling. This also can be done independently for each PDSCH scheduled by a DCI including such a field. In this manner, several HARQ configurations can be used (e.g., can coexist) in different transmissions to the same UE. For example, multicast transmissions can be configured based on option 1 (only ACK) while unicast transmissions can be configured with option 3 (both ACK/NACK).

In some embodiments, the various HARQ configurations can be selected by the gNB based on requirements for a particular transmission (e.g., QoS) and/or congestion of the network. For example, the gNB can decide to forego UE ACK transmissions in highly congested scenarios, configuring the UEs with either option 0 or option 2.

In some embodiments, the UEs comprising a group can be selected by upper-layer protocols of the radio access network (e.g., NG-RAN) and/or by entities in the core network (e.g., 5GC). In some embodiments, the UEs comprising such a group can be a single UE. Upon selecting, or receiving a selection of, served UEs comprising a group, the gNB configures these UEs with an MC-RNTI. This configuration can be performed via unicast or multicast signaling, such as by RRC messages or system information (SI).

In various embodiments, a particular group of users can be selected based on a common geographical area, a common desired service or application, a common desired QoS, etc. Furthermore, the selection of such a group, by the network, can be triggered by various events, including an application- or service-related event that precipitates a need to share information simultaneously with all UEs comprising the group.

In other embodiments, certain UEs can be pre-configured to be members of one more groups associated with respective MC-RNTIs, such that the gNB does not need to provide these MC-RNTIs to the UEs belonging to such groups. In such embodiments, the number of available MC-RNTIs can be the same as the number of different groups (e.g., one MC-RNTI per group), and/or the same as the number of different HARQ configurations. In other words, a particular MC-RNTI can be associated with a group, an HARQ configuration, or both. Such embodiments can be useful and/or beneficial for static scenarios where there are no changes or there is no need to change the HARQ configuration. This can include V2X or national security/public safety (NSPS) use cases requiring HARQ configuration option 3 always on.

In some embodiments, upon defining the group of UE(s) and sharing the MC-RNTI associated with the group (unless pre-configured), the gNB transmits the information to the UE(s) comprising the group via multicast PDSCH. Furthermore, as discussed above, the gNB schedules such a multicast PDSCH by sending DCI over PDCCH, with the DCI's CRC being scrambled with the associated MC-RNTI. In this manner, only the UEs of the group are able to decode the PDCCH transmission and determine the scheduled multicast PDSCH.

Various other embodiments can selectively enable, disable, and/or configure retransmissions of a data packet in response to a HARQ NACK, or even independent of HARQ feedback from a UE. In the latter case, for example, the same (or a similar) number of PRBs can allocated for each transmission and retransmission of a data packet in order to facilitate time-diversity gain. Similarly, the relative arrangement of PRBs in the frequency domain for each transmission and retransmission can be configured to facilitate frequency diversity gain. In such embodiments, the network can determine the number of retransmissions based on various factors, including prevailing channel conditions (e.g., more retransmissions for less robust channel conditions), service or application, etc.

In some embodiments, when HARQ configuration option 3 (both ACK/NACK) is used for a group of UEs having different channel conditions (e.g., distances from gNB), retransmission can be performed in different casting modes targeting specific UEs or sub-sets of UEs comprising the group. For example, the gNB can selectively perform multicast or unicast retransmission based on one or more of the following factors:

A quantity of NACKs received at the gNB from a particular UE relative to a threshold. Such quantities can include a number of consecutive NACKs (n_NACKs) within a pre-defined time period, a ratio of ACKs to NACKs within the time period, etc. The threshold can be configured by the network (e.g., adaptively based on prevailing congestion conditions), or specified as a 3GPP standard.

A quantity of NACKs received by the gNB from all UEs within a time window relative to a threshold.

For example, if either of the above quantities is above a corresponding threshold, the gNB will perform unicast retransmissions to the UEs sending NACKs, with the retransmissions having scheduling DCI CRCs scrambled by the C-RNTIs received by the respective UEs when they first connected to the gNB. Since the C-RNTI uses the UE_ID, such UEs can be addressed individually using a beneficial MCS to increase the chances of a successful retransmission. The threshold can be configured and/or specified in a similar manner as discussed above. As an example, reducing a threshold can cause the gNB to switch to unicast retransmission earlier and/or more frequently.

Alternatively, the gNB can perform unicast retransmissions to the UEs sending NACKs when either of the above quantities is below a corresponding threshold. In such case, increasing a threshold can cause the gNB to switch to unicast retransmission earlier and/or more frequently.

Similarly, if the unicast retransmission indication is implicit to a particular MC-RNTI or a particular DCI configuration and/or field value associated with a scheduling PDCCH, and if NACKs are coming from a small subset of UEs comprising a group, the gNB can perform unicast retransmissions to each UE of the subset based on individual scheduling DCIs with CRCs scrambled by the respective C-RNTIs for those UEs. In this manner, the gNB can address only these specific users.

In some embodiments, the entity (e.g., UE) receiving the transmission and retransmission of a data packet from the other entity (e.g., gNB) can soft-combine the various copies or versions of the same transmission to obtain a more reliable transmission than provided by individual (re-)transmissions. Furthermore, such soft-combining can be performed even if transmission and retransmission, and/or different retransmissions, are provided using different casting mechanisms.

For example, consider the case of multicast transmission and unicast retransmission. The original transmission uses the group-specific MC-RNTI, the process number for the specific HARQ process, and the new-data indicator field signaling that this is the original transmission. Once unicast retransmission is triggered (e.g., by NACK or pre-configuration), it will use the UE-specific C-RNTI, the same HARQ process number used for the original multicast original transmission, and a new-data indicator field signaling that this is a retransmission. With this information, so the receiver UE can perform the soft-combining of such multicast transmissions and unicast retransmissions. In addition, CBGTI (CBG transmission information) and CBGFI (CBG Flushing-out Information) can be utilized in case per-CBG (Code Block Group) retransmission is configured.

In addition to Time Division Multiplexing (TDM) and Frequency Division Multiplexing (FDM) according to a resource grid (e.g., FIG. 4), NR can also provide multiple beams for unicast retransmission from gNB to UE. This is also referred to as Spatial Division Multiplexing (SDM). For example, use of multiple beams can help avoid interference to other UEs and potentially increase the SINR of the retransmission. Accordingly, unicast retransmission to multiple UEs in a group can also employ multiple beams, with each beam carrying a scheduling DCI scrambled by C-RNTI based on individual UE_ID for each of the intended UEs. In this manner, the network can perform unicast retransmission to multiple UEs of a group substantially simultaneously, even if the original transmission to the respective UEs was by multicast.

Figure 7:
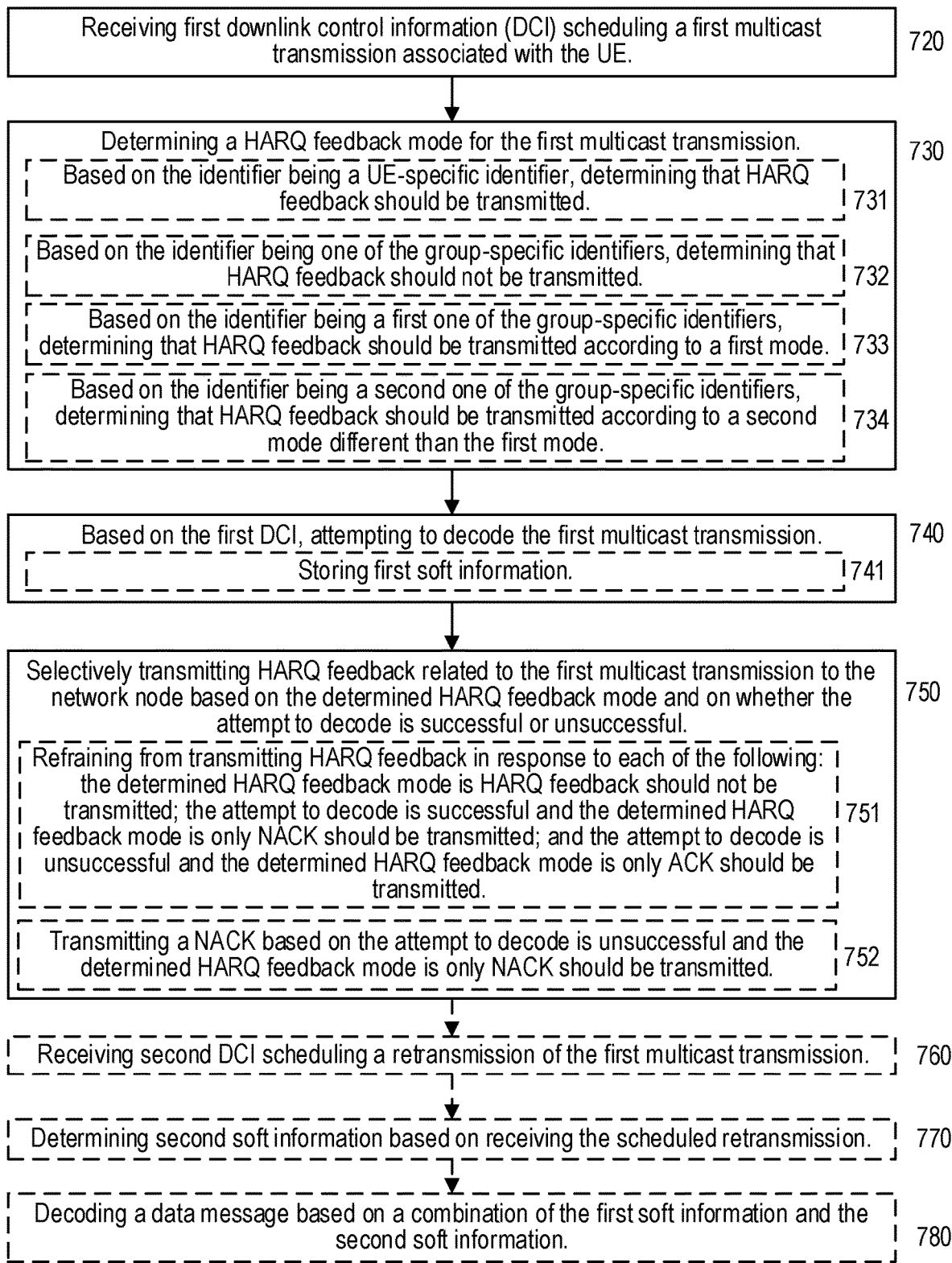
FIG. 7 shows a flow diagram of an exemplary method for a user equipment according to various embodiments of the present disclosure.
Figure 8:
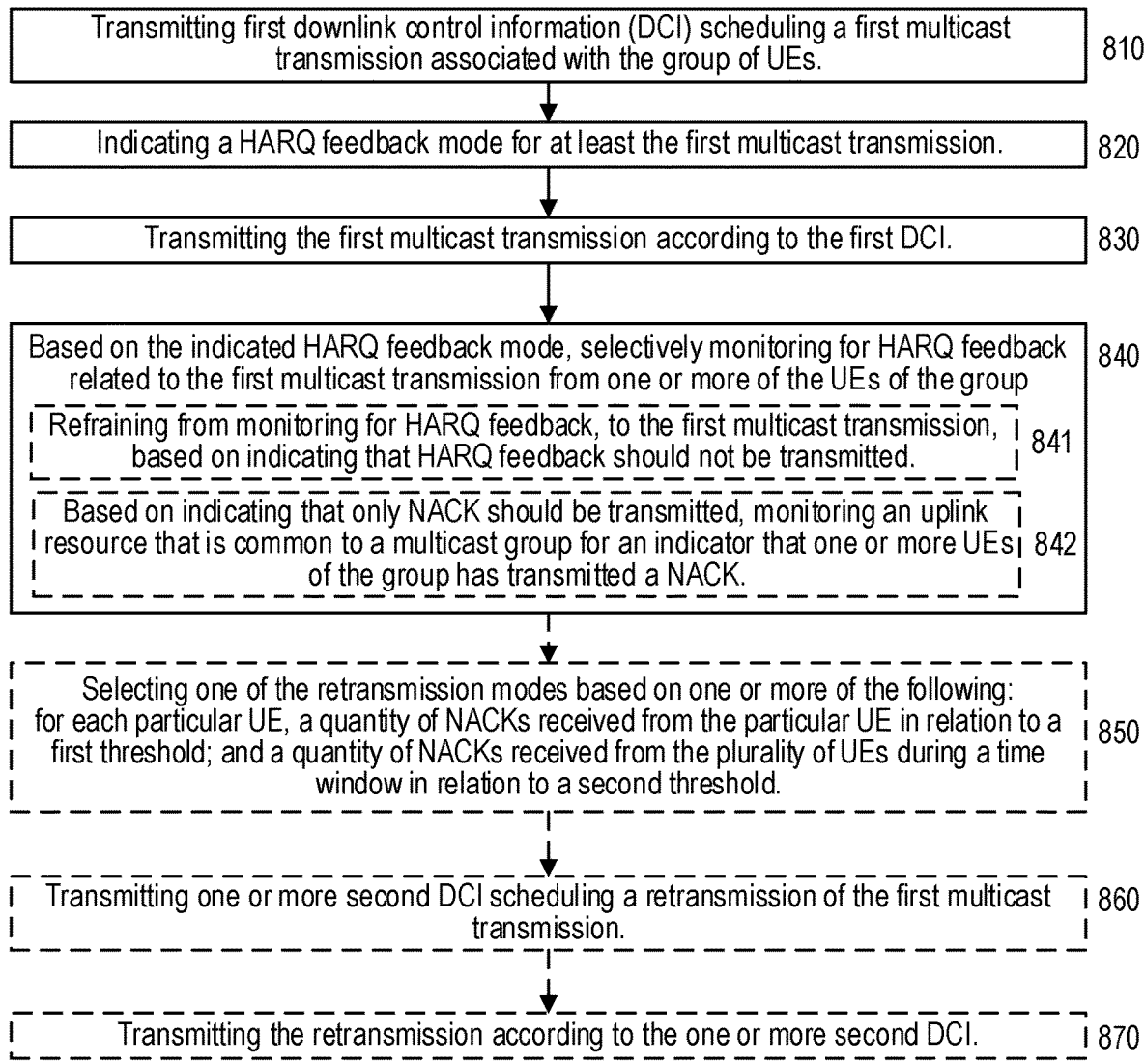
FIG. 8 shows a flow diagram of an exemplary method for a network node in a radio access network according to various embodiments of the present disclosure.

The embodiments described above can be further illustrated by reference to FIGS. 7-8, which depict exemplary methods (e.g., procedures) for UEs and network nodes, respectively. Put differently, various features of the operations described below correspond to various embodiments described above. Furthermore, the exemplary methods shown in FIGS. 7-8 can be used cooperatively to provide various benefits, advantages, and/or solutions to problems described herein. Although FIGS. 7-8 show specific blocks in particular orders, the operations of the exemplary methods can be performed in different orders than shown and can be combined and/or divided into blocks having different functionality than shown. Optional blocks or operations are indicated by dashed lines.

In particular, FIG. 7 shows a flow diagram of an exemplary method (e.g., procedure) for HARQ feedback in relation to multicast transmissions from a network node in a radio access network (RAN), according to various exemplary embodiments of the present disclosure. The exemplary method can be performed by a user equipment (UE, e.g., wireless device, IoT device, modem, etc. or component thereof), such as a UE described herein with reference to other figures.

The exemplary method can include the operations of block 720, where the UE can receive, from the network node, first downlink control information (DCI) scheduling a first multicast transmission associated with the UE. The exemplary method can also include the operations of block 730, where the UE can determine a HARQ feedback mode for the first multicast transmission. The exemplary method can also include the operations of block 740, where the UE can, based on the first DCI, attempt to decode the first multicast transmission. The exemplary method can also include the operations of block 750, where the UE can selectively transmit HARQ feedback, related to the first multicast transmission, to the network node based on the determined HARQ feedback mode and on whether the attempt to decode (i.e., in block 740) is successful or unsuccessful.

In some embodiments, determining the HARQ feedback mode (e.g., in block 730) can be based on one or more of the following: the first DCI and a radio resource control (RRC) message received from the network node before the first DCI.

In some of these embodiments, the first DCI or the RRC message can include a field with the following values: a first value indicating that HARQ feedback should not be transmitted; and a second value indicating that HARQ feedback should be transmitted. In other words, the first DCI or RRC message can populate the field with either of the two values, and the UE is capable of interpreting both values and acting accordingly. For example, the field can be HARQ_config field described above. In some embodiments, the second value can indicate that both positive acknowledgements (ACK) and negative acknowledgements (NACK) should be transmitted, and the field can include a third value indicating that only NACK should be transmitted.

In other of these embodiments, the first DCI includes a cyclic redundancy check (CRC) of the first DCI payload, with the CRC being scrambled by an identifier associated with the UE. In such embodiments, the identifier indicates the HARQ feedback mode. In such embodiments, the RRC message can include configuration information comprising one or more group-specific identifiers (e.g., MC-RNTI), each associated with at least one of the following: a group of one or more UEs, including the UE; and a HARQ feedback mode for multicast transmissions from the network node (e.g., including the first multicast transmission).

In some of these embodiments, the determining operations of block 730 can include the operations of sub-blocks 731-732. In sub-block 731, the UE can, based on the identifier being a UE-specific identifier (e.g., C-RNTI), determine that HARQ feedback should be transmitted. In sub-block 732, the UE can, based on the identifier being one of the group-specific identifiers (e.g., MC-RNTI), determine that HARQ feedback should not be transmitted.

In other of these embodiments, the determining operations of block 730 can include the operations of sub-blocks 733-734. In sub-block 733, the UE can, based on the identifier being a first one of the group-specific identifiers (e.g., MC-RNTI-1), determine that HARQ feedback should be transmitted according to a first mode. In sub-block 734, the UE can, based on the identifier being a second one of the group-specific identifiers (e.g., MC-RNTI-2), determine that HARQ feedback should be transmitted according to a second mode different than the first mode.

In some embodiments, the selectively transmitting operations of block 750 can include the operations of sub-block 751, where the UE can refrain from transmitting HARQ feedback in response to each of the following:
  the determined HARQ feedback mode is HARQ feedback should not be transmitted;
  the attempt to decode is successful and the determined HARQ feedback mode is only negative acknowledgements (NACK) should be transmitted; and
  the attempt to decode is unsuccessful and the determined HARQ feedback mode is only positive acknowledgements (ACK) should be transmitted.

In some embodiments, the selectively transmitting operations of block 750 can include the operations of sub-block 752, where the UE can transmit a negative acknowledgement (NACK) based on the attempt to decode is unsuccessful and the determined HARQ feedback mode is only NACK should be transmitted. In such embodiments, the NACK can be transmitted using an indicator and an uplink resource that are common to a multicast group that includes the UE.

In some embodiments, the exemplary method can also include the operations of block 760, where the UE can subsequently receive second DCI scheduling a retransmission of the first multicast transmission. In various embodiments, the UE can determine a HARQ feedback mode for the retransmission in a similar manner as described above for the first multicast transmission.

In some of these embodiments, the second DCI can indicate that the retransmission is a unicast transmission to the UE. In such embodiments, attempting to decode the first multicast transmission in block 740 can include the operations of sub-block 741, where the UE can store first soft information associated with the first multicast transmission. In such embodiments, the exemplary method can also include the operations of blocks 770-780, where the UE can determine second soft information based on receiving the retransmission and decoding a data message based on a combination of the first soft information and the second soft information In other of these embodiments, the second DCI can indicate that the retransmission is a second multicast transmission. In such embodiments, the first DCI can include a cyclic redundancy check (CRC), of the first DCI payload, that is scrambled by a first group-specific identifier (e.g., MC-RNTI-1) associated with the UE, and the second DCI can include a CRC, of the second DCI payload, that is scrambled by a second group-specific identifier (e.g., MC-RNTI-2) associated with the UE. For example, the first and second group-specific identifiers can be previously received in an RRC configuration message, such as discussed above.

In addition, FIG. 8 shows a flow diagram of an exemplary method (e.g., procedure) for managing hybrid ARQ (HARQ) feedback in relation to multicast transmissions to a group of user equipment (UEs), according to various exemplary embodiments of the present disclosure. The exemplary method can be performed by a network node (e.g., base station, eNB, gNB, etc., or component thereof) of a radio access network (RAN, e.g., E-UTRAN, NG-RAN), such as described herein with reference to other figures.

The exemplary method can include the operations of block 810, where the network can transmit first downlink control information (DCI) scheduling a first multicast transmission associated with the group of UEs. The exemplary method can also include the operations of block 820, where the network node can indicate a HARQ feedback mode for at least the first multicast transmission. The exemplary method can also include the operations of block 830, where the network node can transmit the first multicast transmission according to the first DCI. The exemplary method can also include the operations of block 840, where the network node can, based on the indicated HARQ feedback mode, selectively monitor for HARQ feedback related to the first multicast transmission from one or more UEs of the group.

In some embodiments, the HARQ feedback mode can be indicated (e.g., in block 820) by one or more of the following: the first DCI and respective radio resource control (RRC) messages transmitted to UEs of the group before the first DCI.

In some of these embodiments, the first DCI or the RRC message can include a field with the following values: a first value indicating that HARQ feedback should not be transmitted; and a second value indicating that HARQ feedback should be transmitted. In other words, the first DCI or RRC message can populate the field with either of the two values, and the UE is capable of interpreting both values and acting accordingly. For example, the field can be HARQ_config field described above. In some embodiments, the second value can indicate that both positive acknowledgements (ACK) and negative acknowledgements (NACK) should be transmitted, and the field can include a third value indicating that only NACK should be transmitted.

In other of these embodiments, the first DCI includes a cyclic redundancy check (CRC) of the first DCI payload, with the CRC being scrambled by an identifier associated with the UE. In such embodiments, the identifier indicates the HARQ feedback mode for the first multicast transmission. In such embodiments, the RRC message can include configuration information comprising one or more group-specific identifiers (e.g., MC-RNTI), each associated with at least one of the following: a group of one or more UEs, including the UE; and a HARQ feedback mode for multicast transmissions from the network node (e.g., including the first multicast transmission).

In some of these embodiments, the identifier being a UE-specific identifier (e.g., C-RNTI) indicates that HARQ feedback should be transmitted, while the identifier being one of the group-specific identifiers (e.g., MC-RNTI) indicates that HARQ feedback should not be transmitted.

In other of these embodiments, the identifier being a first one of the group-specific identifiers (e.g., MC-RNTI-1) indicates that HARQ feedback should be transmitted according to a first mode. Likewise, the identifier being a second one of the group-specific identifiers (e.g., MC-RNTI-2) indicates that HARQ feedback should be transmitted according to a second mode different than the first mode.

In some embodiments, the selectively monitoring operations of block 840 can include the operations of sub-block 841, where the network node can refrain from monitoring for HARQ feedback, to the first multicast transmission, based on indicating (e.g., in block 820) that HARQ feedback should not be transmitted. In some embodiments, the selectively monitoring operations of block 840 can include the operations of sub-block 842, where the network node can, based on indicating that only NACK should be transmitted, monitor an uplink resource that is common to a multicast group for an indicator that one or more UEs of the group has transmitted a NACK.

In some embodiments, the exemplary method can also include the operations of blocks 860-870, where the network node can subsequently transmit one or more second DCI scheduling a retransmission of the first multicast transmission and then transmit the retransmission according to the one or more second DCI. In some embodiments, the second DCIs can be transmitted via respective UE-specific beams.

In some embodiments, the retransmission can be transmitted according to one of the following retransmission modes:
 a second multicast transmission to the group of UEs;
 respective unicast transmissions to the respective of UEs of the group; or
 a second multicast transmission to a first subset of the group of UEs, and one or more unicast transmissions to respective UEs of the group that are not included in the first subset.

In some of these embodiments, the exemplary method can also include the operations of block 850, where the network node can select one of these retransmission modes based on one or more of the following:
 for each particular UE, a quantity of NACKs received from the particular UE in relation to a first threshold; and
 a quantity of NACKs received from the plurality of UEs during a time window in relation to a second threshold.
In some embodiments, at least one of the first threshold and the second threshold can be based on congestion conditions associated with the UEs and the network node.

In some embodiments, the one or more second DCI indicates that the retransmission comprises respective unicast transmissions to respective UEs of the group. For example, the one or more second DCI include respective cyclic redundancy check (CRCs), of the respective second DCI payloads, that are scrambled by respective UE-specific identifiers (e.g., C-RNTIs).

In other embodiments, the second DCI indicates that the retransmission is a second multicast transmission to the group of UEs. In such embodiments, the first DCI can include a CRC, of the first DCI payload, that is scrambled by a first group-specific identifier associated with the group of UEs (e.g., MC-RNTI-1), while the second DCI can include a CRC, of the second DCI payload, that is scrambled by a second group-specific identifier associated with the group of UEs (e.g., MC-RNTI-2). For example, the first and second group-specific identifiers can be previously provided to the group of UEs in an RRC configuration message, such as discussed above.

Although various embodiments are described herein above in terms of methods, the person of ordinary skill will recognize that such methods can be embodied by various combinations of hardware and software in various systems, communication devices, computing devices, control devices, apparatus, devices, computer-readable media, computer program products, etc.

Figure 9:
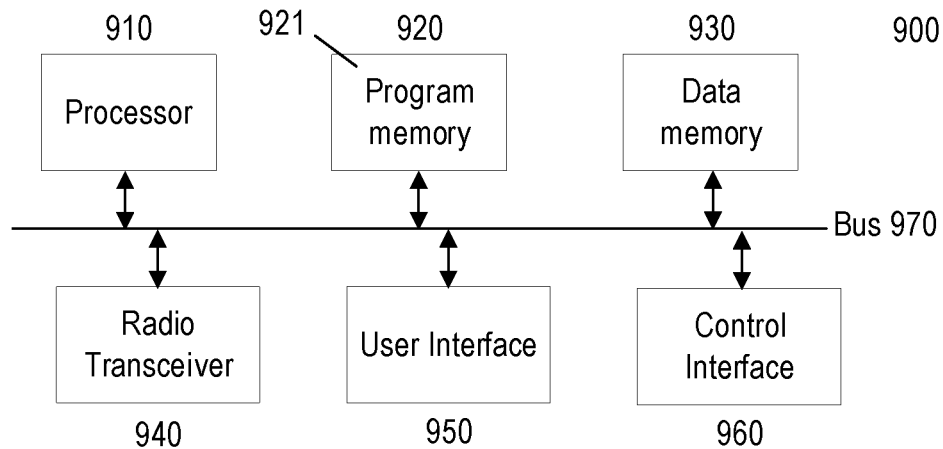
FIG. 9 is a block diagram of an exemplary wireless device or UE, according to various embodiments of the present disclosure.

FIG. 9 shows a block diagram of an exemplary wireless device or user equipment (UE) 900 (hereinafter referred to as "UE 900") according to various embodiments of the present disclosure, including those described above with reference to other figures. For example, UE 900 can be configured by execution of instructions, stored on a computer-readable medium, to perform operations corresponding to one or more of the exemplary methods and/or procedures described above.

UE 900 can include a processor 910 (also referred to as "processing circuitry") that can be operably connected to a program memory 920 and/or a data memory 930 via a bus 970 that can comprise parallel address and data buses, serial ports, or other methods and/or structures known to those of ordinary skill in the art. Program memory 920 can store software code, programs, and/or instructions (collectively shown as computer program product 961 in FIG. 9) that, when executed by processor 910, can configure and/or facilitate UE 900 to perform various operations, including operations corresponding to various exemplary methods described herein. As part of or in addition to such operations, execution of such instructions can configure and/or facilitate UE 900 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 940, user interface 950, and/or control interface 960.

As another example, processor 910 can execute program code stored in program memory 920 that corresponds to MAC, RLC, PDCP, and RRC layer protocols standardized by 3GPP (e.g., for NR and/or LTE). As a further example, processor 910 can execute program code stored in program memory 920 that, together with radio transceiver 940, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 910 can execute program code stored in program memory 920 that, together with radio transceiver 940, implements device-to-device (D2D) communications with other compatible devices and/or UEs.

Program memory 920 can also include software code executed by processor 910 to control the functions of UE 900, including configuring and controlling various components such as radio transceiver 940, user interface 950, and/or host interface 960. Program memory 920 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 920 can comprise an external storage arrangement (not shown) remote from UE 900, from which the instructions can be downloaded into program memory 920 located within or removably coupled to UE 900, so as to enable execution of such instructions.

Data memory 930 can include memory area for processor 910 to store variables used in protocols, configuration, control, and other functions of UE 900, including operations corresponding to, or comprising, any of the exemplary methods and/or procedures described herein. Moreover, program memory 920 and/or data memory 930 can include non-volatile memory (e.g., flash memory), volatile memory (e.g., static or dynamic RAM), or a combination thereof. Furthermore, data memory 930 can comprise a memory slot by which removable memory cards in one or more formats (e.g., SD Card, Memory Stick, Compact Flash, etc.) can be inserted and removed.

Persons of ordinary skill will recognize that processor 910 can include multiple individual processors (including, e.g., multi-core processors), each of which implements a portion of the functionality described above. In such cases, multiple individual processors can be commonly connected to program memory 920 and data memory 930 or individually connected to multiple individual program memories and or data memories. More generally, persons of ordinary skill in the art will recognize that various protocols and other functions of UE 900 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 940 can include radio-frequency transmitter and/or receiver functionality that facilitates the UE 900 to communicate with other equipment supporting like wireless communication standards and/or protocols. In some exemplary embodiments, the radio transceiver 940 includes one or more transmitters and one or more receivers that enable UE 900 to communicate according to various protocols and/or methods proposed for standardization by 3GPP and/or other standards bodies. For example, such functionality can operate cooperatively with processor 910 to implement a PHY layer based on OFDM, OFDMA, and/or SC-FDMA technologies, such as described herein with respect to other figures.

In some exemplary embodiments, radio transceiver 940 includes one or more transmitters and one or more receivers that can facilitate the UE 900 to communicate with various LTE, LTE-Advanced (LTE-A), and/or NR networks according to standards promulgated by 3GPP. In some exemplary embodiments of the present disclosure, the radio transceiver 940 includes circuitry, firmware, etc. necessary for the UE 900 to communicate with various NR, NR-U, LTE, LTE-A, LTE-LAA, UMTS, and/or GSM/EDGE networks, also according to 3GPP standards. In some embodiments, radio transceiver 940 can include circuitry supporting D2D communications between UE 900 and other compatible UEs.

In some embodiments, radio transceiver 940 includes circuitry, firmware, etc. necessary for the UE 900 to communicate with various CDMA2000 networks, according to 3GPP2 standards. In some embodiments, the radio transceiver 940 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 940 can include a transceiver that is capable of wired communication, such as by using IEEE 802.3 Ethernet technology. The functionality particular to each of these embodiments can be coupled with and/or controlled by other circuitry in the UE 900, such as the processor 910 executing program code stored in program memory 920 in conjunction with, and/or supported by, data memory 930.

User interface 950 can take various forms depending on the particular embodiment of UE 900, or can be absent from UE 900 entirely. In some embodiments, user interface 950 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 can comprise a tablet computing device including a larger touchscreen display. In such embodiments, one or more of the mechanical features of the user interface 950 can be replaced by comparable or functionally equivalent virtual user interface features (e.g., virtual keypad, virtual buttons, etc.) implemented using the touchscreen display, as familiar to persons of ordinary skill in the art. In other embodiments, the UE 900 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 900 having a touch screen display are capable of receiving user inputs, such as inputs related to exemplary methods and/or procedures described herein or otherwise known to persons of ordinary skill in the art.

In some embodiments, UE 900 can include an orientation sensor, which can be used in various ways by features and functions of UE 900. For example, the UE 900 can use outputs of the orientation sensor to determine when a user has changed the physical orientation of the UE 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 960 of the UE 900 can take various forms depending on the particular exemplary embodiment of UE 900 and of the particular interface requirements of other devices that the UE 900 is intended to communicate with and/or control. For example, the control interface 960 can comprise an RS-232 interface, a USB interface, an HDMI interface, a Bluetooth interface, a IEEE ("Firewire") interface, an I²C interface, a PCMCIA interface, or the like. In some exemplary embodiments of the present disclosure, control interface 960 can comprise an IEEE 802.3 Ethernet interface such as described above. In some exemplary embodiments of the present disclosure, the control interface 960 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 900 can comprise more functionality than is shown in FIG. 9 including, for example, a video and/or still-image camera, microphone, media player and/or recorder, etc. Moreover, radio transceiver 940 can include circuitry necessary to communicate using additional radio-frequency communication standards including Bluetooth, GPS, and/or others. Moreover, the processor 910 can execute software code stored in the program memory 920 to control such additional functionality. For example, directional velocity and/or position estimates output from a GPS receiver can be available to any application program executing on the UE 900, including various exemplary methods and/or computer-readable media according to various exemplary embodiments of the present disclosure.

Figure 10:
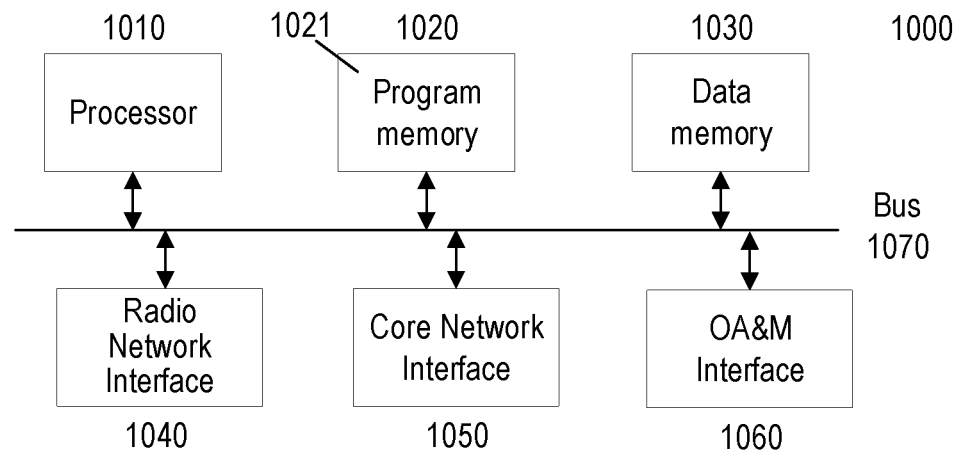
FIG. 10 is a block diagram of an exemplary network node, according to various embodiments of the present disclosure.

FIG. 10 shows a block diagram of an exemplary network node 1000 according to various embodiments of the present disclosure, including those described above with reference to other figures. For example, exemplary network node 1000 can be configured by execution of instructions, stored on a computer-readable medium, to perform operations corresponding to one or more of the exemplary methods and/or procedures described above. In some exemplary embodiments, network node 1000 can comprise a base station, eNB, gNB, or one or more components thereof. For example, network node 1000 can be configured as a central unit (CU) and one or more distributed units (DUs) according to NR gNB architectures specified by 3GPP. More generally, the functionality of network node 1000 can be distributed across various physical devices and/or functional units, modules, etc.

Network node 1000 can include processor 1010 (also referred to as "processing circuitry") that is operably connected to program memory 1020 and data memory 1030 via bus 1070, which can include parallel address and data buses, serial ports, or other methods and/or structures known to those of ordinary skill in the art.

Program memory 1020 can store software code, programs, and/or instructions (collectively shown as computer program product 1021 in FIG. 10) that, when executed by processor 1010, can configure and/or facilitate network node 1000 to perform various operations, including operations corresponding to various exemplary methods described herein. As part of and/or in addition to such operations, program memory 1020 can also include software code executed by processor 1010 that can configure and/or facilitate network node 1000 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1040 and/or core network interface 1050. By way of example, core network interface 1050 can comprise the S1 or NG interface and radio network interface 1040 can comprise the Uu interface, as standardized by 3GPP. Program memory 1020 can also comprise software code executed by processor 1010 to control the functions of network node 1000, including configuring and controlling various components such as radio network interface 1040 and core network interface 1050.

Data memory 1030 can comprise memory area for processor 1010 to store variables used in protocols, configuration, control, and other functions of network node 1000. As such, program memory 1020 and data memory 1030 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1010 can include multiple individual processors (not shown), each of which implements a portion of the functionality described above. In such case, multiple individual processors may be commonly connected to program memory 1020 and data memory 1030 or individually connected to multiple individual program memories and/or data memories. More generally, persons of ordinary skill will recognize that various protocols and other functions of network node 1000 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1040 can comprise transmitters, receivers, signal processors, ASICs, antennas, beamforming units, and other circuitry that enables network node 1000 to communicate with other equipment such as, in some embodiments, a plurality of compatible user equipment (UE). In some embodiments, interface 1040 can also enable network node 1000 to communicate with compatible satellites of a satellite communication network. In some exemplary embodiments, radio network interface 1040 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1040. According to further exemplary embodiments of the present disclosure, the radio network interface 1040 can comprise a PHY layer based on OFDM, OFDMA, and/or SC-FDMA technologies. In some embodiments, the functionality of such a PHY layer can be provided cooperatively by radio network interface 1040 and processor 1010 (including program code in memory 1020).

Core network interface 1050 can comprise transmitters, receivers, and other circuitry that enables network node 1000 to communicate with other equipment in a core network such as, in some embodiments, circuit-switched (CS) and/or packet-switched Core (PS) networks. In some embodiments, core network interface 1050 can comprise the S1 interface standardized by 3GPP. In some embodiments, core network interface 1050 can comprise the NG interface standardized by 3GPP. In some exemplary embodiments, core network interface 1050 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1050 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1000 can include hardware and/or software that configures and/or facilitates network node 1000 to communicate with other network nodes in a RAN, such as with other eNBs, gNBs, ng-eNBs, en-gNBs, IAB nodes, etc. Such hardware and/or software can be part of radio network interface 1040 and/or core network interface 1050, or can be a separate functional unit (not shown). For example, such hardware and/or software can configure and/or facilitate network node 1000 to communicate with other RAN nodes via the X2 or Xn interfaces, as standardized by 3GPP.

OA&M interface 1060 can comprise transmitters, receivers, and other circuitry that enables network node 1000 to communicate with external networks, computers, databases, and the like for purposes of operations, administration, and maintenance of network node 1000 or other network equipment operably connected thereto. Lower layers of OA&M interface 1060 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1040, core network interface 1050, and OA&M interface 1060 may be multiplexed together on a single physical interface, such as the examples listed above.

Figure 11:
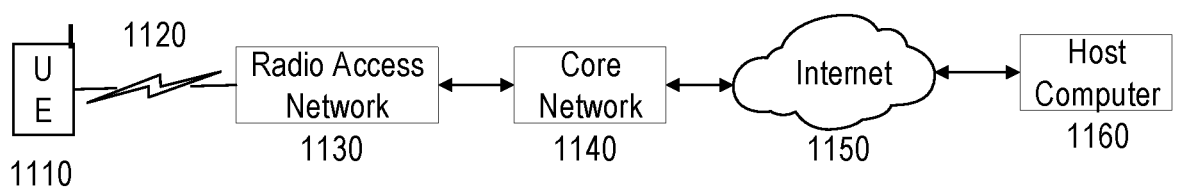
FIG. 11 is a block diagram of an exemplary network configured to provide over-the-top (OTT) data services between a host computer and a UE, according to various embodiments of the present disclosure.

FIG. 11 is a block diagram of an exemplary communication network configured to provide over-the-top (OTT) data services between a host computer and a user equipment (UE), according to one or more exemplary embodiments of the present disclosure. UE 1110 can communicate with radio access network (RAN) 1130 over radio interface 1120, which can be based on protocols described above including, e.g., LTE, LTE-A, and 5G/NR. For example, UE 1110 can be configured and/or arranged as shown in other figures discussed above.

RAN 1130 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1130 can cooperatively operate using licensed and unlicensed spectrum. In some embodiments, RAN 1130 can include, or be capable of communication with, one or more satellites comprising a satellite access network.

RAN 1130 can further communicate with core network 1140 according to various protocols and interfaces described above. For example, one or more apparatus (e.g., base stations, eNBs, gNBs, etc.) comprising RAN 1130 can communicate to core network 1140 via core network interface 1150 described above. In some exemplary embodiments, RAN 1130 and core network 1140 can be configured and/or arranged as shown in other figures discussed above. For example, eNBs comprising an E-UTRAN 1130 can communicate with an EPC core network 1140 via an S1 interface. As another example, gNBs comprising a NR RAN 1130 can communicate with a 5GC core network 1130 via an NG interface.

Core network 1140 can further communicate with an external packet data network, illustrated in FIG. 11 as Internet 1150, according to various protocols and interfaces known to persons of ordinary skill in the art. Many other devices and/or networks can also connect to and communicate via Internet 1150, such as exemplary host computer 1160. In some exemplary embodiments, host computer 1160 can communicate with UE 1110 using Internet 1150, core network 1140, and RAN 1130 as intermediaries. Host computer 1160 can be a server (e.g., an application server) under ownership and/or control of a service provider. Host computer 1160 can be operated by the OTT service provider or by another entity on the service provider's behalf.

For example, host computer 1160 can provide an over-the-top (OTT) packet data service to UE 1110 using facilities of core network 1140 and RAN 1130, which can be unaware of the routing of an outgoing/incoming communication to/from host computer 1160. Similarly, host computer 1160 can be unaware of routing of a transmission from the host computer to the UE, e.g., the routing of the transmission through RAN 1130. Various OTT services can be provided using the exemplary configuration shown in FIG. 11 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 11 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for enabling and/or facilitating application of hybrid ARQ (HARQ) to multicast transmissions. Different HARQ configurations can be created and adaptively used, while retransmissions can be addressed and/or provided to a group of UEs in flexible manner by the network (e.g., serving gNB) without extra reconfiguration or signaling, such as unicast only for intended UEs or multicast to an entire or partial group. Such techniques also facilitate soft-combining of transmissions and retransmissions of a single data packet based on different casting modes, e.g., unicast and multicast. When used in NR and/or LTE UEs (e.g., UE 1110) and eNBs and/or gNBs (e.g., comprising RAN 1130), exemplary embodiments described herein can facilitate increase reliability of data transmission, which can result in increased use of OTT services (e.g., as provided by host computer 1160) by end users.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

E1. A method, performed by a user equipment (UE), for hybrid ARQ (HARQ) feedback in relation to multicast transmissions from a network node in a radio access network (RAN), the method comprising:
 receiving first downlink control information (DCI) scheduling a first multicast transmission associated with the UE;
 based on the first DCI, determining a HARQ feedback mode for the first multicast transmission;
 based on the first DCI, attempting to receive and decode the first multicast transmission; and
 selectively transmitting HARQ feedback to the network node based on the determined HARQ feedback mode and on whether the attempt was successful or unsuccessful.

E2. The method of embodiment E1, wherein the first DCI includes a field that indicates the HARQ feedback mode.

E3. The method of embodiment E2, wherein the HARQ feedback mode indicated by the field is one of the following:
- no HARQ feedback;
- only positive acknowledgements (ACK);
- only negative acknowledgments (NACK); or
- both ACK and NACK.

E4. The method of embodiment E1, wherein:
- the first DCI includes a cyclic redundancy check (CRC), of the first DCI payload, that is scrambled by an identifier associated with the UE; and
- the identifier indicates the HARQ feedback mode.

E5. The method of embodiment E4, wherein determining the HARQ feedback mode for the first multicast transmission comprises:
- based on the identifier being a UE-specific identifier, determining that HARQ feedback should be transmitted; and
- based on the identifier being a group-specific identifier associated with the UE, determining that HARQ feedback should not be transmitted.

E6. The method of embodiment E4, wherein determining the HARQ feedback mode for the first multicast transmission comprises:
- based on the identifier being a first group-specific identifier associated with the UE, determining that HARQ feedback should be transmitted according to a first mode; and
- based on the identifier being a second group-specific identifier associated with the UE, determining that HARQ feedback should be transmitted according to a second mode different than the first mode.

E7. The method of any of embodiments E4-E6, further comprising receiving, from the network node, configuration information comprising one or more group-specific identifiers associated with multicast transmissions from the network node.

E8. The method of any of embodiments E1-E7, further comprising:
- subsequently receiving second DCI scheduling a retransmission of the first multicast transmission; and
- based on the second DCI, determining a HARQ feedback mode for the scheduled retransmission.

E9. The method of embodiment E8, wherein:
- the second DCI indicates that the retransmission is a unicast transmission to the UE;
- attempting to receive and decode the first multicast transmission comprises storing first soft information; and
- the method further comprises:
  - determining second soft information based on receiving the scheduled retransmission; and
  - decoding a data message based on a combination of the first soft information and the second soft information.

E10. The method of embodiment E9, wherein the second DCI includes a cyclic redundancy check (CRC), of the second DCI payload, that is scrambled by a UE-specific identifier.

E11. The method of embodiment E8, wherein:
- the second DCI indicates that the retransmission is a second multicast transmission;
- the first DCI includes a cyclic redundancy check (CRC), of the first DCI payload, that is scrambled by a first group-specific identifier associated with the UE; and
- the second DCI includes a CRC, of the second DCI payload, that is scrambled by a second group-specific identifier associated with the UE.

E12. The method of any of embodiments E1-E11, wherein selectively transmitting HARQ feedback comprises refraining from transmitting HARQ feedback based on the determined HARQ feedback mode indicating no HARQ feedback.

E13. A method, performed by a network node in a radio access network (RAN), for managing hybrid ARQ (HARQ) feedback in relation to multicast transmissions to a plurality of user equipment (UEs), the method comprising:
- transmitting first downlink control information (DCI) scheduling a first multicast transmission associated with the UEs, wherein the first DCI indicates a HARQ feedback mode for the first multicast transmission; and
- transmitting the first multicast transmission according to the first DCI; and
- selectively receiving HARQ feedback, from one or more UEs, based on the indicated HARQ feedback mode and on whether the respective UEs were successful or unsuccessful in decoding the first multicast transmission.

E14. The method of embodiment E13, wherein the first DCI includes a field that indicates the HARQ feedback mode.

E15. The method of embodiment E14, wherein the HARQ feedback mode indicated by the field is one of the following:
- no HARQ feedback;
- only positive acknowledgements (ACK);
- only negative acknowledgements (NACK); and
- both ACK and NACK.

E16. The method of embodiment E13, wherein:
- the first DCI includes a cyclic redundancy check (CRC), of the first DCI payload, that is scrambled by an identifier associated with one or more of the UEs; and
- the identifier indicates the HARQ feedback mode.

E17. The method of embodiment E16, wherein:
- the identifier being a UE-specific identifier indicates that HARQ feedback should be transmitted in response to the first multicast transmission; and
- the identifier being a group-specific identifier indicates that HARQ feedback should not be transmitted in response to the first multicast transmission.

E18. The method of embodiment E16, wherein:
- the identifier being a first group-specific identifier indicates that HARQ feedback should be transmitted according to a first mode; and
- the identifier being a second group-specific identifier indicates that HARQ feedback should be transmitted according to a second mode different than the first mode.

E19. The method of any of embodiments E16-E18, further comprising transmitting, to the plurality of UEs, configuration information comprising one or more group-specific identifiers associated with multicast transmissions from the network node.

E20. The method of any of embodiments E13-E19, further comprising:
- subsequently transmitting one or more second DCI scheduling a retransmission of the first multicast transmission, wherein the one or more second DCI indicate a HARQ feedback mode for the scheduled retransmission; and
- transmitting the retransmission according to the one or more second DCI.

E21. The method of embodiment E20, wherein the retransmission is transmitted according to one of the following retransmission modes:
- a second multicast transmission to the plurality of UEs;
- a plurality of unicast transmissions to the respective plurality of UEs; or
- a second multicast transmission to a first subset of the plurality of UEs, and one or more unicast transmissions to respective one or more UEs of a second subset of the plurality of UEs.

E22. The method of embodiment E21, further comprising selecting one of the retransmission modes based on one or more of the following:
- for each particular UE, a quantity of negative acknowledgements (NACKs) received from the particular UE in relation to a first threshold; and
- a quantity of NACKs received from the plurality of UEs during a time window in relation to a second threshold.

E23. The method of embodiment E22, wherein at least one of the first threshold and the second threshold is based on congestion conditions associated with the UEs and the network node.

E24. The method of any of embodiments E20-E23, wherein:
- the second DCI indicates that the retransmission is a unicast transmission to the UE; and
- the second DCI includes a cyclic redundancy check (CRC), of the second DCI payload, that is scrambled by a UE-specific identifier.

E25. The method of any of embodiments E20-E23, wherein:
- the second DCI indicates that the retransmission is a second multicast transmission;
- the first DCI includes a cyclic redundancy check (CRC), of the first DCI payload, that is scrambled by a first group-specific identifier associated with the UE; and
- the second DCI includes a CRC, of the second DCI payload, that is scrambled by a second group-specific identifier associated with the UE.

E26. The method of any of embodiments E20-E25, wherein:
- the first DCI indicates no HARQ feedback in relation to the first multicast transmission; and
- selectively receiving HARQ feedback comprises refraining from receiving HARQ feedback based on the first DCI indicating no HARQ feedback.

E27. A user equipment, UE, configured to manage UE energy consumption with respect communication with a network node in a radio access network, RAN, the UE comprising:
- transceiver circuitry configured to communicate with the network node; and
- processing circuitry operatively coupled to the transceiver circuitry, whereby the processing circuitry and the transceiver circuitry are configured to perform operations corresponding to any of the methods of embodiments E1-E12.

E28. A user equipment, UE, configured to manage UE energy consumption with respect communication with a network node in a radio access network, RAN, the UE being further arranged to perform operations corresponding to any of the methods of embodiments E1-E12.

E29. A non-transitory, computer-readable medium storing computer-executable instructions that, when executed by processing circuitry of a user equipment, UE, configured to manage UE energy consumption with respect communication with a network node in a radio access network, RAN, configure the UE to perform operations corresponding to any of the methods of embodiments E1-E12.

E30. A computer program product comprising computer-executable instructions that, when executed by processing circuitry of a user equipment, UE, configured to manage UE energy consumption with respect communication with a network node in a radio access network, RAN, configure the UE to perform operations corresponding to any of the methods of embodiments E1-E12.

E31. A network node, in a radio access network, RAN, configured to manage user equipment, UE, energy consumption with respect to communication between the UE and the network node, the network node comprising:
- radio network interface circuitry configured to communicate with the UE; and
- processing circuitry operatively coupled to the radio network interface circuitry, whereby the processing circuitry and the radio network interface circuitry are configured to perform operations corresponding to any of the methods of embodiments E13-E25.

E32. A network node, in a radio access network, RAN, configured to manage user equipment, UE, energy consumption with respect to communication between the UE and the network node, the network node being further arranged to perform operations corresponding to any of the methods of embodiments E13-E25.

E33. A non-transitory, computer-readable medium storing computer-executable instructions that, when executed by processing circuitry of a network node in a radio access network, RAN, that is configured to manage user equipment, UE, energy consumption with respect to communication between the UE and the network node, configure the network node to perform operations corresponding to any of the methods of embodiments E13-E25.

E34. A computer program product comprising computer-executable instructions that, when executed by processing circuitry of a network node in a radio access network, RAN, that is configured to manage user equipment, UE, energy consumption with respect to communication between the UE and the network node, configure the network node to perform operations corresponding to any of the methods of embodiments E13-E25.

The invention claimed is:

1. A method, performed by a user equipment (UE), for hybrid ARQ (HARQ) feedback in relation to multicast transmissions by a network node in a radio access network (RAN), the method comprising:
- receiving, from the network node, first downlink control information (DCI) scheduling a first multicast transmission by the network node;
- determining a HARQ feedback mode for the first multicast transmission by the network node, based on one or more of the following: the first DCI, and a radio resource control (RRC) message received from the network node before the first DCI;
- based on the first DCI, attempting to decode the first multicast transmission by the network node; and
- based on the determined HARQ feedback mode and on whether the attempt to decode is successful or unsuccessful, selectively transmitting to the network node HARQ feedback related to the first multicast transmission by the network node.

2. The method of claim 1, wherein the first DCI or the RRC message includes a field with the following values:
- a first value indicating that HARQ feedback should not be transmitted; and
- a second value indicating that HARQ feedback should be transmitted.

3. The method of claim 2, wherein:
the second value indicates that both positive acknowledgements (ACK) and negative acknowledgements (NACK) should be transmitted; and
the field includes a third value indicating that only NACK should be transmitted.

4. The method of claim 1, wherein:
the first DCI includes a payload and a cyclic redundancy check (CRC) of the payload;
the CRC is scrambled by an identifier associated with the UE; and
the identifier indicates the HARQ feedback mode for the first multicast transmission by the network node.

5. The method of claim 4, wherein the RRC message includes configuration information comprising one or more group-specific identifiers, each associated with at least one of the following:
a group of one or more UEs, including the UE; and
a HARQ feedback mode for multicast transmissions by the network node.

6. The method of claim 5, wherein determining the HARQ feedback mode for the first multicast transmission comprises:
based on the CRC being scrambled by a UE-specific identifier associated with the UE, determining that HARQ feedback should be transmitted; and
based on the CRC being scrambled by one of the group-specific identifiers, determining that HARQ feedback should not be transmitted.

7. The method of claim 5, wherein determining the HARQ feedback mode for the first multicast transmission comprises:
based on the CRC being scrambled by a first one of the group-specific identifiers, determining that HARQ feedback should be transmitted according to a first mode; and
based on the CRC being scrambled by a second one of the group-specific identifiers, determining that HARQ feedback should be transmitted according to a second mode different than the first mode.

8. The method of claim 1, wherein selectively transmitting HARQ feedback comprises refraining from transmitting HARQ feedback in response to each of the following:
the determined HARQ feedback mode is HARQ feedback should not be transmitted;
the attempt to decode is successful and the determined HARQ feedback mode is only negative acknowledgements (NACK) should be transmitted; and
the attempt to decode is unsuccessful and the determined HARQ feedback mode is only positive acknowledgements (ACK) should be transmitted.

9. The method of claim 1, wherein:
selectively transmitting HARQ feedback to the network node comprises transmitting a negative acknowledgement (NACK) based on the attempt to decode being unsuccessful and the determined HARQ feedback mode being only NACK should be transmitted; and
the NACK is transmitted using an indicator and an uplink resource that are common to a multicast group that includes the UE.

10. A method, performed by a network node in a radio access network (RAN), for managing hybrid ARQ (HARQ) feedback in relation to multicast transmissions to a group of user equipment (UEs) by the network node, the method comprising:

transmitting first downlink control information (DCI) scheduling a first multicast transmission by the network node;
indicating a HARQ feedback mode for at least the first multicast transmission by the network node, based on one or more of the following: the first DCI, and respective radio resource control (RRC) messages transmitted to UEs of the group before the first DCI;
transmitting the first multicast transmission according to the first DCI; and
based on the indicated HARQ feedback mode, selectively monitoring for HARQ feedback from one or more of the UEs of the group in relation to the first multicast transmission by the network node.

11. The method of claim 10, wherein the first DCI or the RRC messages include a field with the following values:
a first value indicating that HARQ feedback should not be transmitted; and
a second value indicating that HARQ feedback should be transmitted.

12. The method of claim 11, wherein:
the second value indicates that both positive acknowledgements (ACK) and negative acknowledgements (NACK) should be transmitted; and
the field includes a third value indicating that only NACK should be transmitted.

13. The method of claim 10, wherein:
the first DCI includes a payload and a cyclic redundancy check (CRC) of the payload;
the CRC is scrambled by an identifier associated with one or more of the UEs; and
the identifier indicates the HARQ feedback mode for the first multicast transmission by the network node.

14. The method of claim 13, wherein the RRC message includes configuration information comprising one or more group-specific identifiers, each associated with at least one of the following:
a group of one or more UEs; and
a HARQ feedback mode for multicast transmissions by the network node.

15. The method of claim 14, wherein:
the CRC being scrambled by a UE-specific identifier, associated with one of the UEs, indicates that HARQ feedback should be transmitted; and
the CRC being scrambled by one of the group-specific identifiers indicates that HARQ feedback should not be transmitted.

16. The method of claim 14, wherein:
the CRC being scrambled by a first one of the group-specific identifiers indicates that HARQ feedback should be transmitted according to a first mode; and
the CRC being scrambled by a second one of the group-specific identifiers indicates that HARQ feedback should be transmitted according to a second mode different than the first mode.

17. A user equipment (UE) configured for hybrid ARQ (HARQ) feedback in relation to multicast transmissions by a network node in a radio access network (RAN), the UE comprising:
a radio transceiver configured to communicate with the network node; and
processing circuitry operatively coupled to the radio transceiver, whereby the processing circuitry and the radio transceiver are configured to:
receive, from the network node, first downlink control information (DCI) scheduling a first multicast transmission by the network node;

determine a HARQ feedback mode for the first multicast transmission by the network node, based on one or more of the following: the first DCI, and a radio resource control (RRC) message received from the network node before the first DCI;

based on the first DCI, attempt to decode the first multicast transmission by the network node; and based on the determined HARQ feedback mode and on whether the attempt to decode is successful or unsuccessful, selectively transmit to the network node HARQ feedback related to the first multicast transmission by the network node.

18. The UE of claim 17, wherein one of the following applies:

the first DCI or the RRC message includes a field with the following values: a first value indicating that HARQ feedback should not be transmitted, and a second value indicating that HARQ feedback should be transmitted; or the first DCI includes a payload and a cyclic redundancy check (CRC) of the payload, the CRC is scrambled by an identifier associated with the UE, and the identifier indicates the HARQ feedback mode for the first multicast transmission.

19. A non-transitory, computer-readable medium storing computer-executable instructions that, when executed by processing circuitry of a user equipment (UE) configured for hybrid ARQ (HARQ) feedback in relation to multicast transmissions by a network node in a radio access network (RAN), configure the UE to perform operations corresponding to the method of claim 1.

20. A network node configured to operate in a radio access network (RAN) and to manage hybrid ARQ (HARQ) feedback in relation to multicast transmissions to a group of user equipment (UEs) by the network node, the network node comprising:

radio network interface circuitry configured to communicate with the UEs; and processing circuitry operatively coupled to the radio network interface circuitry, whereby the processing circuitry and the radio network interface circuitry are configured to perform operations corresponding to the method of claim 10.

21. The network node of claim 20, wherein one of the following applies:

the first DCI or the RRC message includes a field with the following values: a first value indicating that HARQ feedback should not be transmitted, and a second value indicating that HARQ feedback should be transmitted; or the first DCI includes a payload and a cyclic redundancy check (CRC) of the payload, the CRC is scrambled by an identifier associated with the UE, and the identifier indicates the HARQ feedback mode for the first multicast transmission.

22. A non-transitory, computer-readable medium storing computer-executable instructions that, when executed by processing circuitry of a network node configured to manage hybrid ARQ (HARQ) feedback in relation to multicast transmissions to a group of user equipment (UEs) by the network node in a radio access network (RAN), configure the network node to perform operations corresponding to the method of claim 10.

* * * * *

UNITED STATES PATENT AND TRADEMARK OFFICE
CERTIFICATE OF CORRECTION

PATENT NO. : 12,250,081 B2  
APPLICATION NO. : 17/784779  
DATED : March 11, 2025  
INVENTOR(S) : Stare et al.

Page 1 of 1

It is certified that error appears in the above-identified patent and that said Letters Patent is hereby corrected as shown below:

In the Specification

In Column 1, Line 55, delete "one more" and insert -- one or more --, therefor.

In Column 2, Line 9, delete "MIME." and insert -- MME. --, therefor.

In Column 2, Line 28, delete "LIE" and insert -- UE --, therefor.

In Column 9, Line 13, delete "(AMF)," and insert -- (SMF), --, therefor.

In Column 9, Line 17, delete "of to device" and insert -- of device --, therefor.

In Column 18, Line 15, delete "group ID" and insert -- group_ID --, therefor.

In Column 19, Line 7, delete "one more" and insert -- one or more --, therefor.

In Column 29, Line 37, delete "MMES," and insert -- MMEs, --, therefor.

Signed and Sealed this  
Twenty-third Day of December, 2025

John A. Squires  
*Director of the United States Patent and Trademark Office*